(12) United States Patent
Weaver

(10) Patent No.: US 7,584,016 B2
(45) Date of Patent: Sep. 1, 2009

(54) ITEM MONITORING SYSTEM AND METHODS

(75) Inventor: Frederick Michael Weaver, Huntersville, NC (US)

(73) Assignee: Intrinsic Marks International LLC, Huntersville, NC (US)

( * ) Notice: Subject to any disclaimer, the term of this patent is extended or adjusted under 35 U.S.C. 154(b) by 227 days.

(21) Appl. No.: 10/956,859

(22) Filed: Sep. 30, 2004

(65) Prior Publication Data

US 2005/0131578 A1   Jun. 16, 2005

Related U.S. Application Data

(60) Provisional application No. 60/507,323, filed on Sep. 30, 2003.

(51) Int. Cl.
*G07F 7/00* (2006.01)

(52) U.S. Cl. .................................. 700/213

(58) Field of Classification Search .............. 700/213, 700/244, 301, 305; 73/862.627, 862.381, 73/862.391, 862.629, 862.636, 862.637, 73/862.68; 235/385
See application file for complete search history.

(56) References Cited

U.S. PATENT DOCUMENTS

| 3,596,281 | A | * | 7/1971 | Lombardi ................. 346/34 |
| 4,208,648 | A | | 6/1980 | Naumann |
| 4,646,754 | A | * | 3/1987 | Seale ..................... 600/587 |
| 4,734,034 | A | | 3/1988 | Maness et al. |
| 4,771,792 | A | * | 9/1988 | Seale ..................... 600/587 |
| 4,856,993 | A | | 8/1989 | Maness et al. |
| 5,245,290 | A | * | 9/1993 | Cannon et al. ............ 324/457 |
| 5,541,570 | A | | 7/1996 | McDowell |
| 5,671,362 | A | | 9/1997 | Cowe et al. |
| 5,756,904 | A | | 5/1998 | Oreper et al. |
| 5,878,620 | A | | 3/1999 | Gilbert et al. |
| 6,044,717 | A | | 4/2000 | Biegelsen et al. |
| 6,263,737 | B1 | * | 7/2001 | Schoess .................. 73/583 |
| 6,289,747 | B1 | * | 9/2001 | Billen et al. ............ 73/862.046 |
| 6,346,680 | B1 | | 2/2002 | Takahashi et al. |
| 6,427,540 | B1 | * | 8/2002 | Monroe et al. ............ 73/753 |
| 6,522,155 | B2 | | 2/2003 | Pietsch et al. |
| 6,546,813 | B2 | * | 4/2003 | Hubbard, Jr. ............ 73/862.041 |
| 6,840,117 | B2 | * | 1/2005 | Hubbard, Jr. ............ 73/862.041 |

(Continued)

FOREIGN PATENT DOCUMENTS

EP    0 733 985 A2    9/1996

(Continued)

*Primary Examiner*—Gene Crawford
*Assistant Examiner*—Ramya Prakasam

(57) ABSTRACT

An item monitoring system is provided which is operative at points of storage automatically to sense the presence, number of item(s) stored and relative location of items and to generate near real-time item and location data from storage locations so that time-related changes can be compared to detect item additions and subtractions, and to recognize and report events such as shrink/theft, low inventory conditions and misplaced items. Embodiments incorporate a surface sensing system comprised of one or more contiguous item sensor strips that measure the relative pressure of items in contact with a surface or a hanger support using pressure sensitive analog type conductive material. Item information can be collected from multiple hangers and/or storage surfaces and relayed to databases and application systems for varied uses. The system and method disclosed are cost effective and widely applicable to many categories of inventory application providing real-time updates without item packaging changes.

14 Claims, 12 Drawing Sheets

U.S. PATENT DOCUMENTS

| | | |
|---|---|---|
| 6,848,762 B2 * | 2/2005 | King et al. ..................... 347/7 |
| 7,037,268 B1 * | 5/2006 | Sleva et al. ................. 600/459 |
| 7,179,421 B1 * | 2/2007 | Ho ......................... 422/82.02 |
| 7,189,360 B1 * | 3/2007 | Ho ......................... 422/82.02 |
| 2001/0020395 A1 * | 9/2001 | Hubbard, Jr. ........... 73/862.041 |
| 2002/0104369 A1 * | 8/2002 | Baker et al. ................. 73/31.6 |
| 2002/0147597 A1 | 10/2002 | Connors et al. |
| 2002/0161652 A1 | 10/2002 | Paullin et al. |
| 2003/0136201 A1 * | 7/2003 | Hubbard, Jr. ............. 73/862.41 |
| 2003/0174099 A1 | 9/2003 | Bauer et al. |
| 2003/0222762 A1 | 12/2003 | Beigl et al. |
| 2004/0034581 A1 | 2/2004 | Hill et al. |

FOREIGN PATENT DOCUMENTS

| | | |
|---|---|---|
| WO | WO 00/29925 | 5/2000 |

\* cited by examiner

ITEM MONITORING SYSTEM AND METHODS

CROSS-REFERENCE TO RELATED APPLICATION(S)

The present application claims priority from U.S. Provisional Application No. 60/507,323, filed Sep. 30, 2003, the entire contents of which are incorporated herein by reference.

FIELD OF THE INVENTION

The invention relates to an item monitoring system, an item management system employing information generated by the item monitoring system and related methods of managing item inventories and creating sensors used to implement the systems. It further relates to methods for managing or tracking movements of inventory items to and from a storage location, for example inventory stored on one or more hangers and/or surfaces. In particular, one aspect of the invention provides a system and method for monitoring the movement of items to and from storage locations that is especially, though not exclusively, beneficial in solving problems relating to item inventory outages, restocking notifications, shrink/theft, and misplaced items, and providing useful information relating to market research on consumer selection of items without privacy concerns and brand promotion by demand display and coupon events.

BACKGROUND OF THE INVENTION

A state-of-the-art drug store or grocery store is reasonably sophisticated with regard to bulk monitoring of inventory movements and management of inventory. Most items carry bar code identification to expedite annual inventory restocking, checkout and price checks. Customers select desired items from the shelves and/or hangers, carry them to a point of sale, such as a checkout station, where the customer self checks or a checkout clerk scans each item with a bar code scanner to identify and price the item and to charge it to the customer.

Scanning each item's bar code label at the point of sale captures the movement of the item out of store inventory and is used to initiate actions to replenish the reduced shelf stock. Drawbacks of this system are inventory movements captured at the point of sale, i.e., at the cash register, may not reflect shelf conditions because some withdrawals from a shelf may not be checked out at the cash register owing to pilferage, breakage, misplacement or items returned by customers to the wrong locations, and so on. Since stock outages are quite costly to vendors, it would be desirable for vendors to have access to even more up-to-date and accurate information on shelf stock such that vendors could maintain the shelf stock at desired levels.

A particular problem is posed by the need to monitor high value inventory since such inventory is most subject to loss, i.e., theft, and since once the high value inventory is taken from the premises, the probability for recovering the inventory is substantially diminished. Another shortcoming of conventional inventory monitoring techniques is presented by the case where a consumer selects a frozen item and then decides for whatever reason to discard the item at the nearest (typically non-freezer) shelf location. Absent quick action, this scenario is a cause for inventory loss and potential health hazard.

There is accordingly a need for an item monitoring system that can, without requiring operator intervention, track addition and removal of items to and from storage locations sufficiently well to be useful in a broad range of applications including retail, commercial, medical, military and industrial environments.

SUMMARY OF THE INVENTION

Embodiments of the invention are intended to solve, among other things, the problem of how to provide unattended item monitoring that can remotely report what items are added to and removed from a storage volume, for example from a retail display hanger or shelf space. In one embodiment, a structure for storing items is equipped with an item monitoring system having a contiguous sensor unit that detects the movement of items to and from said hanger and/or said shelf and reports to a microcontroller or other processing element that, in turn, can communicate with a communications unit to convey inventory changes to a central location, such as a host computer or the like.

A store responsible party, such as security office manger, can be kept continually aware of what inventory items are present and under watch. By means of embodiments of the invention, whenever an item or items are removed from a hanger and/or shelf, the item monitoring system can automatically communicate with a host, such as a central server, and/or a database so as to provide time, date, sensor/item identification, count of the reporting sensor unit and associated data. Of specific interest to store security is when a number of items are simultaneously removed indicating the profile of a shrink/theft event, particularly of interest for known high value and/or high theft items.

The item monitoring system may readily be configured to recognize and report a variety of addition and removal patterns including but not limited to shrink/theft events. For example when a shopper removes a single item to read, compares and evaluates then returns it to the shelf or hanger such "consumer consideration" is valuable information to the item brand owner as well as the retail organization. On site, real-time interdiction such as the instant generation of a coupon near certain items could influence favorably a purchase decision thus serving as an in-store micro-marketing tool. Embodiments of the invention can therefore recognize particular buying profiles and if so instructed and the display area so equipped, cause an item specific coupon to be printed and/or displayed to influence favorably a buy decision. Further, the invention would be able to follow up by tracking the removal of the coupon-linked item within a certain period of time.

Collectively the above benefits are enabled by use of the invention disclosed without change to item packaging, the addition of electronic identification and without associating a specific individual customer to the change event unless it is for the purpose of security.

In one broad aspect the invention provides an item monitoring system is provided that includes a sensor strip extending in a generally linear fashion. The sensor strip advantageously includes a resistor network selected from the group of a parallel resistor network and a series resistor network. The sensor strip also provides an output that is dependent upon force applied thereto such that the output provided by the sensor strip is reflective of a cumulative effect of one or more items placed upon the sensor strip. The item monitoring system of this embodiment also includes a processing element in communication with said sensor strip for receiving and processing the output of said sensor strip. The item monitoring system can further include a communication unit for transmitting the results and/or alarm notifications generated by the processing element.

In one embodiment, the item monitoring system further includes a host for receiving the information transmitted by the communications unit such that the host and/or the processing element is capable of detecting a change in the item count. The host may be associated with a database for maintaining a record of the data provided by the item monitoring system and/or additional data associated with the various items. Associated methods for monitoring item inventory and fabricating a sensor strip are also provided according to other aspects of the present invention.

BRIEF DESCRIPTION OF THE DRAWINGS

Some embodiments of the invention including one way of carrying it out will now be described in detail below with reference to the drawings in which.

DETAILED DESCRIPTION OF SOME PREFERRED EMBODIMENTS

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The systems and methods of the invention are particularly, but not exclusively, useful to facilitate the monitoring of retail inventory hanger, shelf and bin storage. Among other applications, the system and method of the present invention are particularly suitable for monitoring those products that are not otherwise continually supervised by sales or inventory clerk personnel so as to prevent shrink/theft and/or minimize inventory outages of items. It is contemplated that the invention can be beneficial in solving several inventory management problems by moving the point of monitoring of item withdrawals to the storage area focal point, rather than at a centralized checkout and pointes of exit as is customary today in retail stores.

While the invention can be applied to a wide variety of items, subject only to their physical suitability for handling by the system of the invention, and their economic significance, a particular field of application is in tracking and inventory management of higher priced items, especially grocery and drug store related retail management. Such an application will now be described in more detail by way of example but not of limitation.

A retail item monitoring system according to the invention, which is suitable for a grocery or drug store environment, monitors and reports item traffic into and out of storage in retail storage locations. While the system and method of the present invention may be implemented in various configurations as described below, typical sensors developed in accordance with the present invention are adapted to monitor open hanger and shelf storage areas.

For example, a grocery or drug store implementation of the item monitoring system of the invention can be a mixture of item hanger, shelf storage and other forms of item display and storage, each of which has a sensing unit as will be described. Preferably each sensing unit, be it for use with an item hanger, shelf or storage bin, incorporates a communications unit to transmit inventory information to the store database and to receive control, training and/or item data receipt confirmation signals or is otherwise associated or in communication with a communications unit, such as via an electrical bus.

Figure 1:
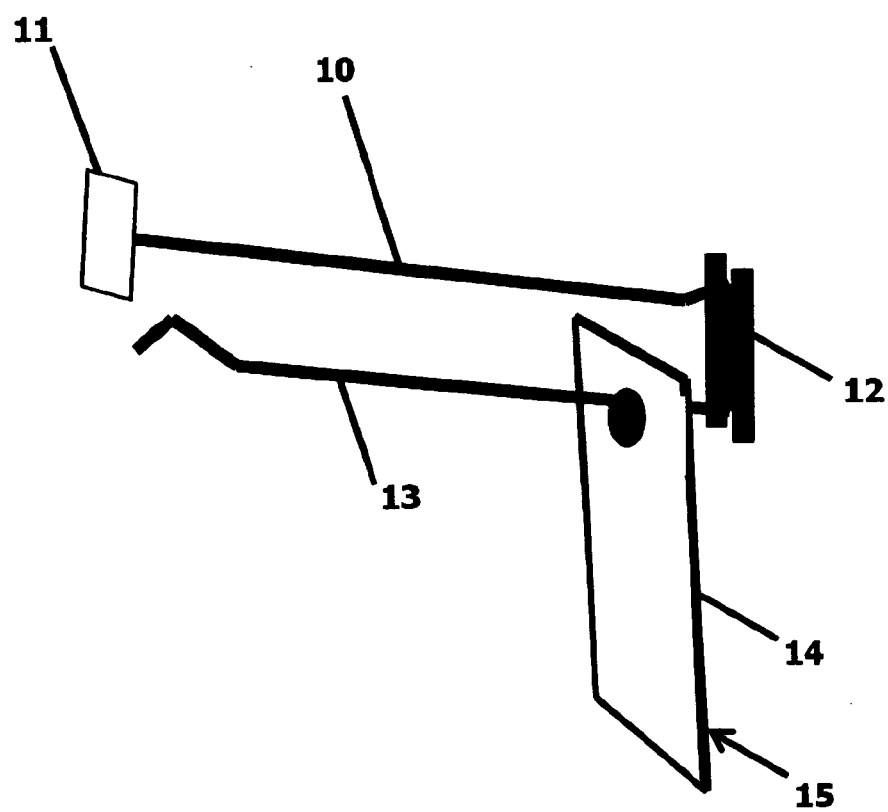
FIG. 1 is a schematic representation of a conventional retail display hanger with an item.

Referring to the drawings, one conventional configuration of retail item hanger is shown in FIG. 1 and is composed of a top rod 10 that holds an end display placard 11 at one end and has a hanger bracket 12 at the other end. As shown, the hanger bracket is adapted to cooperably engage a rack or other structural support so as to extend outwardly therefrom. Extending in parallel to the top rod 10 is a hanger lower rod 13 that provides the support means for hanging items 14 that are slidably received by the lower rod 13. The hanging item generally has a product label 15, such as on the back of the package.

Figure 2A:
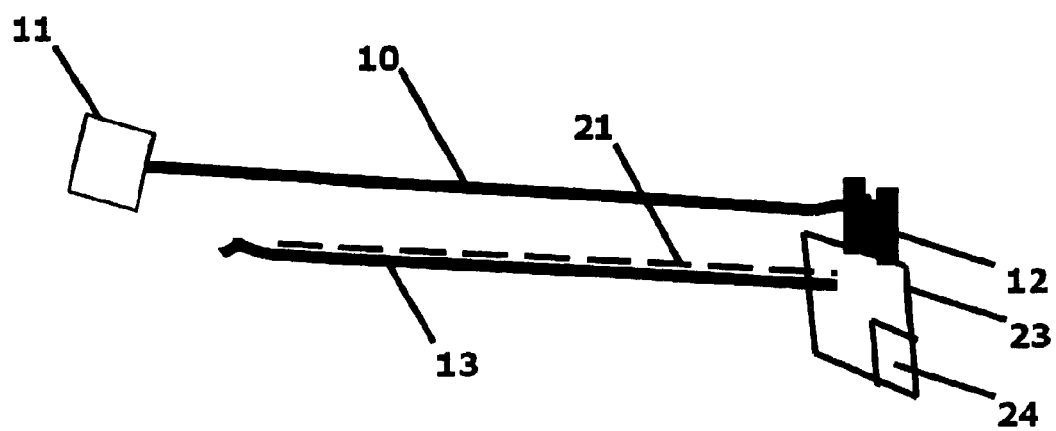
FIGS. 2A and 2B are perspective and cross-sectional views of a smart retail display hanger according to one embodiment of the present invention.

FIG. 2A is a schematic perspective representation of an item monitoring system 10 for use in conjunction with a hanger according to one embodiment of the invention. As noted in conjunction with FIG. 1, the hanger is composed of a top rod 10 having a placard display 11 at one end, and a mounting bracket 12 at the other end. In the illustrated embodiment, the mounting bracket 12 includes a pair of prongs or hooks for engaging a rack or other support structure in a conventional manner such that the hanger extends outwardly therefrom in a cantilevered manner. The hanger also includes a lower rod 13 to suspend items (not shown), such as for retail sale. The hanger may also include a processing element, such as a microcontroller 23, and optionally a communication unit, such as a RF communication unit 24. The processing element and the communication unit may be communicably connected to the lower rod in various manners including affixation to one end of the lower rod proximate the mounting bracket 12.

Figure 2B:
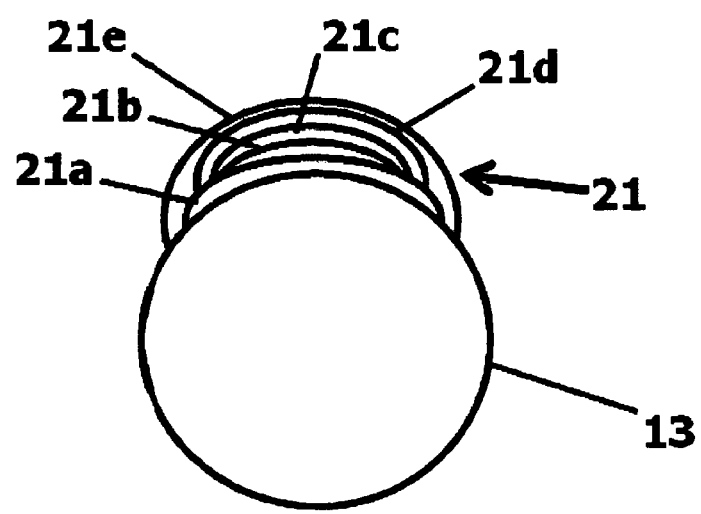

According to the present invention, the lower hanger rod 13 has a sensing unit for detecting items hung thereon and for providing data relating to the presence of such items to the processing element. In the illustrated embodiment of FIGS. 2A and 2B, the sensing unit comprises a sensor strip 21 composed of a flexible base material 21a that supports a conductive trace 21b, a dielectric layer 21c that overlies the conductive trace, and an analog type electric conductive ink 21d that is deposited upon the dielectric layer such that the conductive ink is electrically connected to the conductive trace at the distal end of the hanger rod but is otherwise separated therefrom by the dielectric material; all of which are overlaid by a protective dielectric coating 21e, as described in detail below. While the conductive trace, dielectric material and the pressure sensitive ink may be deposited in various manners, they can be screen printed or printed according to another multi-layer printing process according to one embodiment. The sensor strip may instead be formed in a number of different manners as will as be described below. To facilitate installation of the sensor strip of the illustrated embodiment, the flexible base material may include an adhesive backing, such as a peel and stick adhesive backing, for adhering to the lower rod. In FIG. 2B which depicts the lower rod of the hanger in cross section, the conductive trace, dielectric material and the overlaid contiguous pressure sensitive analog type electric conductive ink are separated from the metallic lower rod 13 by the flexible base material that is secured thereto with adhesive backing.

As known by one skilled in the art, analog type, also known as resistive change, electric conductive ink implements the property that resistance changes can vary from high resistance (e.g., 10 M ohms with no current flowing) in the absence of any applied pressure down to perhaps 10 K ohms according to the magnitude of external force applied to the surface of the ink and the design formulation of the configured analog type conductive ink. One exemplary conductive ink is DS-118-44 that is commercially available from Creative Materials Inc. of Tyngsboro, Mass. that may be adapted to the pressure range requirements of various embodiments of the invention. The pressure sensitive ink may be caused to expand by the introduction of a compatible inorganic foam agent that degasses during the pressure sensitive ink curing thus causing a rise in height with associated air gaps. The end result is a pressure sensitive ink having a plurality of fine sized open air gaps that enables compression under pressure with desired reduction in resistance under pressure thus yielding an analog type return voltage for measurement. As known by one skilled in the art and as described below, the disclosed contiguous electric conductive ink can be reformulated into a variety of useful resistivity functions by changing percentage loading of ingredients and reconfigured into a variety of useful surface sensors demonstrating series, parallel or a combination of both types of resistor networks without diminishing the originality of the disclosures herein. Other variable resistance, pressure sensitive measurement means may be employed instead of the pressure sensitive ink including conductive rubber, conductive foams and the like.

Figure 3A:
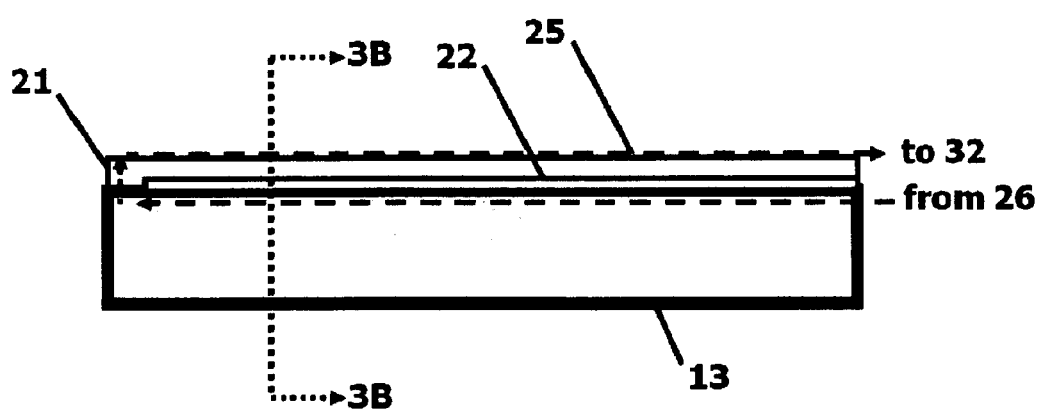
FIGS. 3A and 3B are schematic cross-sectional side representation of a lower rod of a retail display hanger in accordance with one embodiment of the present invention and a corresponding section taken along line 3B-3B of FIG. 3A, respectively.
Figure 3B:
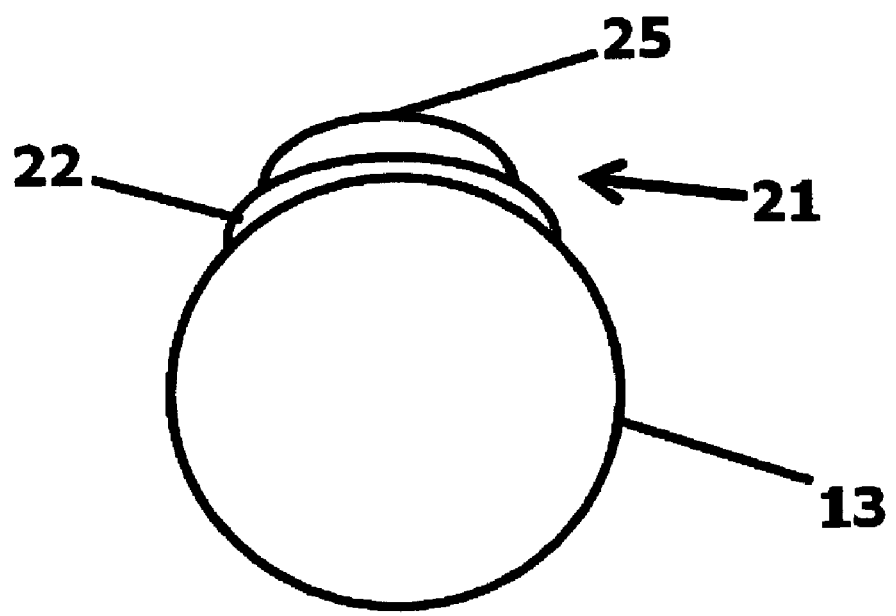

In an alternative embodiment depicted in FIGS. 3A and 3B where rod material conductivity permits current to be conducted along the length of the lower rod itself from its proximal end to its distal end, the conductive trace and the overlying dielectric material need not be utilized. Instead, at the distal end of the lower rod, the lower rod may be electrically connected to one end of the variable resistance material. Regardless of the embodiment, at the proximal end, the processing element and, in particular, an analog to digital (A/D) converter may be electrically connected to the other end of the variable resistance material. In the absence of any items and thus in the absence of any applied pressure, the pressure sensitive conductive ink is relative insulative and little, if any, current flows from the rod's distal end through the pressure sensitive conductive ink to the processing element for detection. As items are hung from the lower rod, however, the resistance of the pressure sensitive conductive ink decreases and increasing amounts of current flows through the pressure sensitive conductive ink for detection by the processing element. Following proper training as described below, the processing element can determine the number of items hung from the lower rod based upon the input current to the lower rod and the return current detected by the processing element.

An alternative embodiment of the sensor strip combines a generally parallel set of conductive but not touching traces in a dual serpentine pattern deposited or otherwise formed on a dielectric substrate with a secondary and separate layer of overlay material carrying an analog type pressure sensitive material such as can be created by combining a non-conductive foam or sponge layer of material with carbon, copper or other such conductive powered material(s) and bonding same to the non-conductive foam. The air gap between the conductive trace pattern and the pressure sensitive foam material enables the analog sensitivity desired. The resultant two layers are then laminated thus creating the desired sensing means. One of the conductive traces can be electrically connected to the distal end of the hanger rod thereof, while the other conductive trace can be electrically connected at the proximal end of the hanger rod to the processing element, typically via an A/D converter. In the absence of any items and thus any applied pressure, little or no current is conducted between the conductive traces such that little or no return current is detected by the processing element. As items are hung from the lower rod and pressure is applied to the pressure sensitive overlay material, however, current is conducted between the conductive traces and detected by the processing element with the magnitude of the current depending upon the applied pressure and, in turn, the number of items hung from the lower rod as in the above described embodiment. In addition to the foregoing serial resistor embodiments, the sensor strip may comprise a parallel resistor network as described in detail below in conjunction with the sensing of items placed upon a two-dimensional surface.

Advantageously, the sensing unit shown in FIGS. 2A, 2B, 3A and 3B can sense the pressure changes attributable to the placement and removal of individual ones of a plurality of items 14 along the length of the lower rod 13 using said contiguous analog type electric conductive ink. By means of the invention, the process of removing an item 14 from the lower rod 13 for purchase can be reliably sensed approximately at the moment of removal, depending on the duty cycle algorithm power on timing, due to the change in current flow via the conductive ink pattern as detected by the microcontroller 23 and, in one embodiment, communicated by the communication unit 24 to update the item inventory tracking database (not shown).

The sensor unit of the lower rod 13 is thus cognizant of item removals and replacements with that sensed signal data being electrically stored by the microcontroller means 23 and/or sent forward to a database, such as in real-time via the communication means 24, for general inventory change recognition and for automated alarm condition generation provided by the system of the invention thus yielding significant business advantages by recognizing potential shrink/theft events in a timely manner. The item monitoring system disclosed can be beneficial within most any retail facility for managing and controlling item stock levels and for predefined item traffic conditions. As such it is particularly beneficial to retail operations desiring unattended monitoring of items on display and is especially useful for retail shrink/theft alerts, as described above, regardless of the particular retail or business environment as well as for alert messaging when a restocking count remaining for an item is detected and subsequent count down alerts, if desired, to an out of stock condition message. The prompt availability of fresh, or contemporaneous, inventory status information to retail management transmitted from the item monitoring system of the present invention enables a new level in item monitoring reducing distribution delays and cutting inventory losses.

Referring now to FIGS. 3A and 3B, a segment of interest of the lower rod of one embodiment of a hanger having a sensor unit configured as a series resistor network for use in the item monitoring system described in FIGS. 3A and 3B comprises the lower rod 13 of a metal shelf hanger as currently in retail display use, a dielectric strip 22 extending from the proximal end of the lower rod 13 adjacent the rack or other support structure to a location near the distal end, and a contiguous analog type resistive circuit 21. In this embodiment, the conductivity of the lower rod permits the lower rod to be utilized to transmit current, such as from a power source 26 operating under control of the microcontroller 23, to the distal end thereof. The resistive circuit 21 comprises a pressure sensitive conductive ink 25 deposited upon the dielectric material and overlaid by a protective material. At one end the pressure sensitive conductive ink is electrically connected to the distal end of the lower rod while the other end of the pressure sensitive conductive ink is connected to a microcontroller 23, such as via an A/D converter 32 that provides a digital value representative of the current returning from the sensor unit following transmission therethrough. In one embodiment, for example, the A/D converter provides a single value representative of the item count following calculations using the return current and Ohm's Law for a series or parallel resistor network, as appropriate, by the microcontroller 23. As shown in FIG. 2, the processing unit and the communications unit 24 may optionally located to the rear of the hanger lower rod 13 nearest the location of the wall mounting hanger bracket 12.

The sensor unit may be applied to the lower rod in various manners. In one embodiment, a peel and stick sensor strip can be used for convenience of installation and maintenance. In this embodiment depicted in FIGS. 2A and 2B, a substrate such as PET is screen printed with layers in the following order. The first layer upon the substrate forms the lower conductive trace and is formed of conductive material such as a silver carrying ink that defines the primary sensor pattern for sourcing current. In this embodiment, a dielectric material is deposited over the lower conductive trace and a pressure sensitive conductive ink is printed upon the dielectric material to provide a return conductive path with a connection having been made between the lower conductive trace and the pressure sensitive conductive ink at a location near the distal end of the lower rod. As noted above, after curing, the pressure sensitive conductive ink has a resistance that varies based upon the weight of the items supported thereby. A layer of protective material that enhances the useful life of the invention can be added which may be formed of an abrasion resistant material known to one skilled in the art. Finally, an optional layer formed of commercial printing ink may be added that can be emblazoned with legends, logos or other markings, such as to promote a particular product or brand.

Installation involves sizing the strip to the length of the hanger and cutting off any excess length from the end of the peel and stick sensor strip prior to removing the protective backing for placement on the hanger so as to extend parallel to and on the top side of the lower rod. Once in place along the hanger rod, a conductive element, such as a wire, trace, etc., is connected to and extended from each of the lower conductive trace and the pressure sensitive conductive ink. These conductive elements advantageously extend to a microcontroller and communications unit with separate conductive traces running along respective legs or prongs of the hanger bracket for providing power and ground to the microcontroller and the communications unit. As such, the power source 26 may either be local or remote depending upon the design. The rack or other peg board into which the mounting bracket is inserted can therefore include similar conductive members that are positioned so as to individually establish electrical contact between the respective legs of the hanger bracket and power and ground, respectively. The peg board thus serves as a back plane support for the hanger and its source for power and ground. In one embodiment, for example, the power and ground conductive traces carried over the respective legs of the hanger bracket are individually pressed against contact strips on the back side of the back plane support that run power vertically along one column of peg board holes and ground vertically along either side. The processing element and the communication unit can likewise be provided with power and ground through the back plane support, such as via peel and stick traces. Further, by means known to one skilled in the art communications can be achieved using the power network, such as via spread spectrum communications.

The sensor unit of FIG. 2 defines a generally linear storage volume, for receipt of multiple items 14, between the proximal and distal ends of the shelf hanger lower rod 13, the upper count limits of which storage volume is determined either de facto by only permitting storage of a single row of items 14 of various sizes and shapes up to the electric item sensor hanger unit's physical length constraint.

As shown in FIG. 3 one embodiment incorporates a series resistor network design method with R1, R2, R3, . . . Rn analog type resistors being defined at each of a plurality of discrete locations along the length of the lower rod by the pressure sensitive ink strip that extends along the lower arm and separated therefrom by the dielectric material. In this regard, the resistors extend in series between the point of contact between the pressure sensitive ink strip and the distal end of the lower rod and the proximal end of the lower rod at which point the A/D converter is also electrically connected to the pressure sensitive ink strip. Although the individual resistors can be thought of as extending in series between the opposed ends of the lower rod, the pressure sensitive ink is applied or printed such that the resistors extend contiguously along the length of the lower rod. As a result of the series configuration, the generally comb-like input voltage trace 31 from a digital output pin of the microcontroller 23 provides a known reference voltage to the analog type resistive strip.

Figure 4:
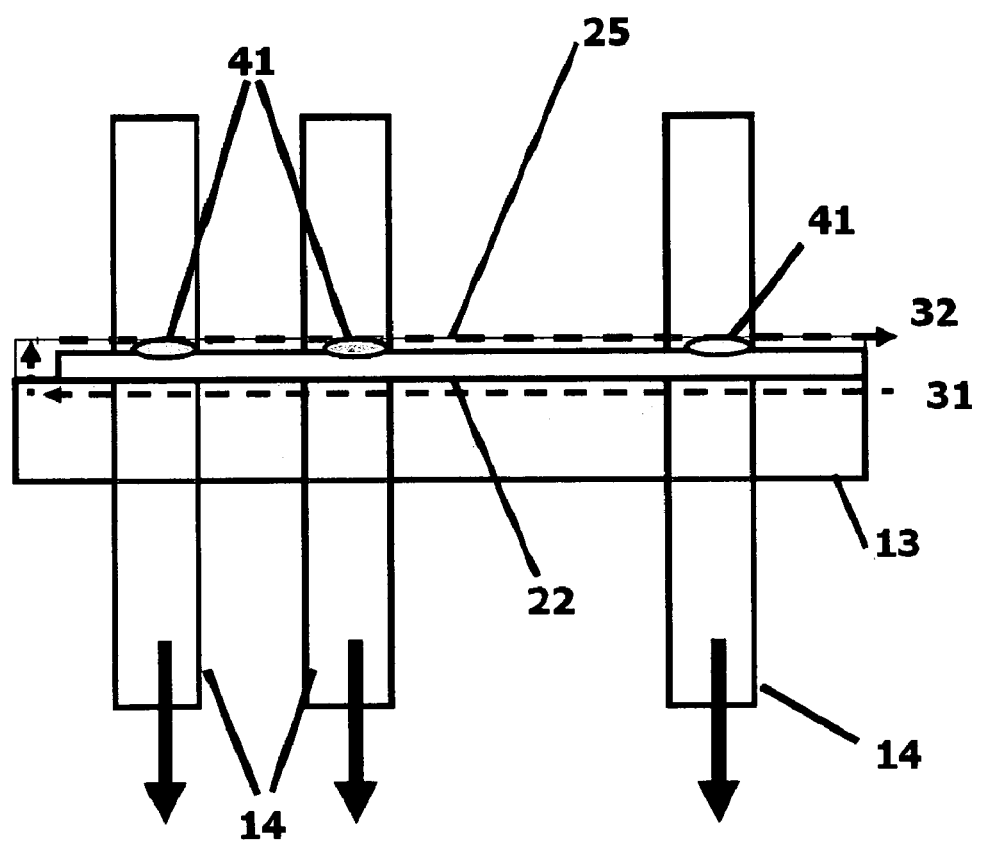
FIG. 4. is a schematic cross-sectional side representation of a lower rod of a retail display hanger with items hanging therefrom in accordance with one embodiment of the present invention.

Referring now to FIG. 4, a side view of the lower rod 13 pictured in FIG. 2 is presented with three representative item hangers 14 pressing at a number of discrete locations 41 on the contiguous electric conductive surface strip 21 that is configured as a series resister network such that when input signal is applied to the hanger rod 13, it travels along the hanger rod and returns to the microcontroller 23 through the analog type electric conductive ink to be sensed by the microcontroller 23 following conversion by the A/D converter 32 thus enabling the microcontroller to measure the signal changes caused by the cumulative series resistor network formed by the analog type electric conductive ink.

In contrast to a sensor strip having a parallel resistor network in which the length of the sensor strip can be cut to fit the lengths of individual rod hangers 13 without changing the functionality of the sensor unit as described below, the foregoing series resistor netork must generally be made to specific lengths for each known length of rod hanger 13. With the addition of an extra screen printed layer, however, it is possible to incorporate a dielectric material between the conductive trace and the pressure sensitive conductive ink of the embodiment depicted in FIGS. 2A and 2B that can be converted to a conductive material so as to serve as a connector at points where minimum heat has been applied thus joining the conductive trace and the pressure sensitive conductive ink. In this embodiment the series resistor sensor is trimmed to length and then a heat source such as a flat ended soldering iron is briefly applied to the cut end resulting in the melting of the convertible dielectric material, such as Creative Materials 111-21, to form a connection between layers at the distal end of the rod.

The first part of the setup procedure is the training of said microcontroller 23 to recognize the pressure from a single item 14 on the pressure sensitive strip 21. Once the shelf hanger 12 is physically installed, such as onto a rack or other peg board, the microcontroller 23 is initialized and the setup process begins. First the microcontroller stores the digital value provided by the A/D converter 32 at steady state without any items 14 present to obtain a baseline and then it performs an unloaded calibration process for future reference readings.

Then the first item 14 is hung on the lower rod 13 so as to apply pressure to the analog type electric conducive ink strip 21 and the microcontroller 23 notes the new digital value provided by the A/D converter 32 in response to the single item and calculates the delta value representing the presence of one item 14, i.e., the change in the digital value in response to hanging a single item from the rod. In practice the microcontroller may be trained by obtaining a plurality of readings from the A/D converter 32 in response to hanging a single item from the rod to enable an average delta for a first item 14 to be calculated with a +/− variance.

Further, a microcontroller 23 may calibrate the strip 21 at the factory or on-site by taking an orderly set of measurements along the rod 13 using a known weight and storing them in permanent memory associated with or included within the microcontroller for future reference. Each such calibration reading should change systematically, if at all, provided the strip 21 is uniform in formulation and application to the underlying dielectric material 22. These calibration readings if required enable the microcontroller 23 to determine a +/− variance related to single item count recognition capabilities.

After the microcontroller 23 signals via a message via the communication unit 24 that it is satisfied with the single item 14 training reference data, the barcode identification for the hanging item type, or individual bar code ID of the item 14, is stored, such as by utilizing a wireless link between a hand held barcode reader with wireless communications link that is operated by the trainer and is in communication with a wireless communication link of the communications unit 24 and then to the microcontroller 23. After training with a single item, the next step is for a plurality of items 14 equaling a desired restocking count to be hung on the lower rod 13 and the microcontroller 23 to direct that current be applied to the conductive trace in the embodiment of FIGS. 2A and 2B or the rod 13 itself in the embodiment of FIGS. 3A and 3B. The current then returns via the pressure sensitive conductive ink to the A/D converter and, in turn, to the microcontroller 23, thus enabling the microcontroller 23 to calculate the expected number of items present for restocking count based on stored and newly measured sensor data. In this regard, based upon the delta that is generated by a single item and the delta generated by the plurality of items that equal the desired restocking count, the microcontroller can determine the number of items currently hung on the rod following Ohm's Law for series resister networks, or if a parallel implementation Ohm's Law for a parallel resistor network.

The microcontroller 23 may then signal a message to the hand held device via the communication means 24 that includes the count of items hung on the rod and/or other related data. If the count determined by the microcontroller equals the actual count, the person hanging items 14 confirms that the correct reorder count was computed via a message to the microcontroller 23. Should the known manual count differ from the microcontroller's 23 expected item count, after reconfirming the manual count, the error is noted to the microcontroller 23 via a return message. This step enables said microcontroller 23 to further refine its calculation of the digital value that will be reflective of the restocking quantity by adjusting the variance allowed. After this step is completed a greater than restocking quantity is placed on the hanger.

Figure 5:
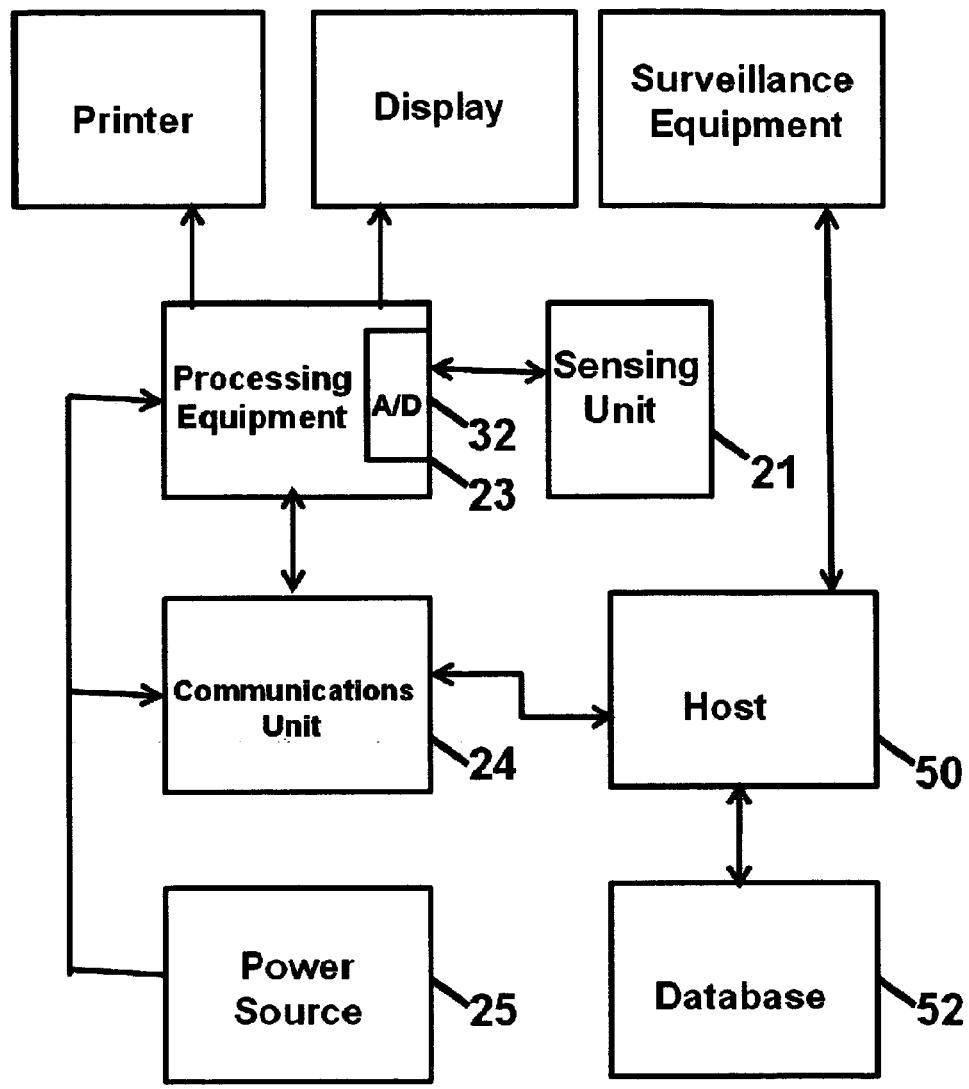
FIG. 5 is a block diagram of an item monitoring system according to one embodiment of the present invention.

From this point the microcontroller 23 periodically applies a signal 31 via the conductive trace to the sensor strip 21 for measurement by the A/D converter 32 and comparison by the microcontroller 23 of the stored item count data for the restocking quantity with the new item count calculated based on the most recent digital value provided by the A/D converter. If a change of merit is detected and confirmed by the microcontroller 23 then the microcontroller 23 communicates 24 the recognition of the change to the central host 50, such as a server or other computing device, and an associated database 52, as shown in FIG. 5, for action in accordance with an application program executed by the central host. The change of merit may be differently defined, but is typically a substantial percentage of the delta attributable to a single item. The frequency of these calculations and the specifics of the microcontroller 23 program steps are determined by the user specifications for the monitoring application requirements. Of value in certain security related applications is to vary in a random manner or some combination of regular and random the time between readings.

As known to one skilled in the art variations to the training process procedures can be implemented without altering the unique nature of the disclosed train by example process. Likewise it is well known in the art how to remotely manage and update devices from a central computer via hardwire and/or wireless means thus enabling a fast and quick method to keep individual devices updated with the latest program code so such are not taught in this disclosure.

The sensitivity of the strips 21 to accommodate a wide range of item 14 pressures is a consideration to insure the maximum utility for the disclosed item monitoring system. Since a sensed pressure is both a function of the contact area between the item 14 and the strip 21 and the analog type electric conductive ink formulation of the strip 21 the design of the hanger strip and selection of the formulation or formulations can both influence the sensitivity.

A method to increase sensitivity is to cause the contact surface area to be reduced or minimized by shaping the top surface of the strip 21 into a ridge or a sharply rounded ridge along the length of the rod sensor surfaces using known screen printing techniques. Thus the contact surface area is basically determined by the area of the package material of the item 14 touching the sensor surface and the area of that portion of the strip 21 that contacts the item which is minimal compared to the overall package size. As such very light weight items 14 will cause a resistive change in the strip 21 due to its weight being concentrated on a smaller sensor area that in turn can be detected with greater sensitivity in signal changes by the microcontroller 23.

Figure 6:
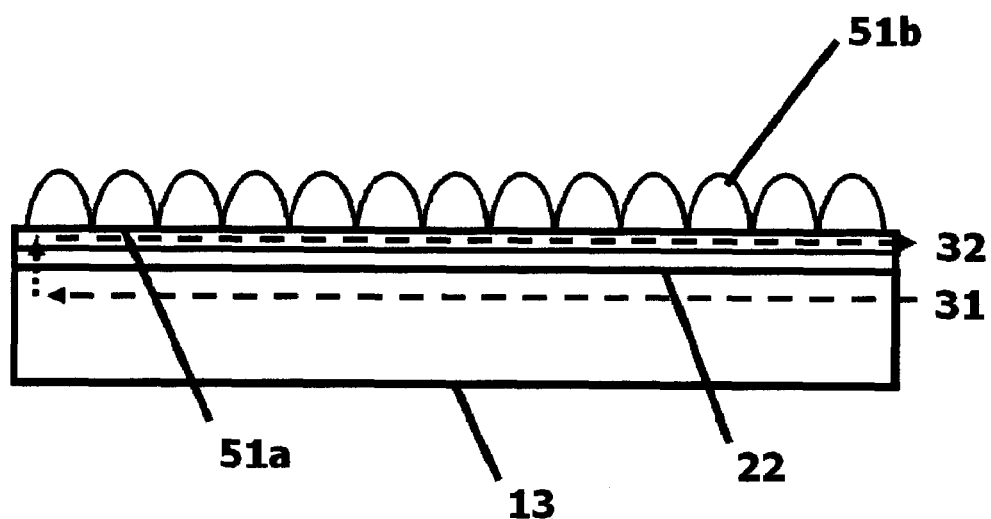
FIG. 6. is a schematic representation of a lower rod of a retail display hanger with shaped pressure points in accordance with one embodiment of the present invention.

It is further a novel approach to incorporate a plurality of layers of analog type conductive inks where the bottom layer has a higher resistance than a top layer or layers that may be shaped conically, elliptically or rectangular in nature as shown in FIG. 6. The resister relationship thus created from this third dimension layered configuration of two or more different resistive analog type electric conductive material actually yields a more sensitive means to detect the presence of an item 14 than either can alone. It is important that the base layer's two dimensional geometry be similar in shape and size as the base geometry of the added layer or layers whether shaped or not because the flow of electrons through the layered strip is affected by the matching of layer base geometries.

Referring now to FIG. 6, a side section view of the lower rod 13 with two layers making up the pressure sensitive material such that the base layer 51a is more resistive than the top layer 51b that is in this example shaped into a fine row of conical hemi-spheres. One method to achieve the conical geometry is to use a screen printing process such that when the screen is "snapped" from contact the resultant top layer 51b assumes the desired generally conical shape according to the density of the screen mesh used. In steady state without any items 14 the microcontroller 23 measures a signal resultant from the combined resistance from the two generally resistive layers working in parallel.

Figure 7:
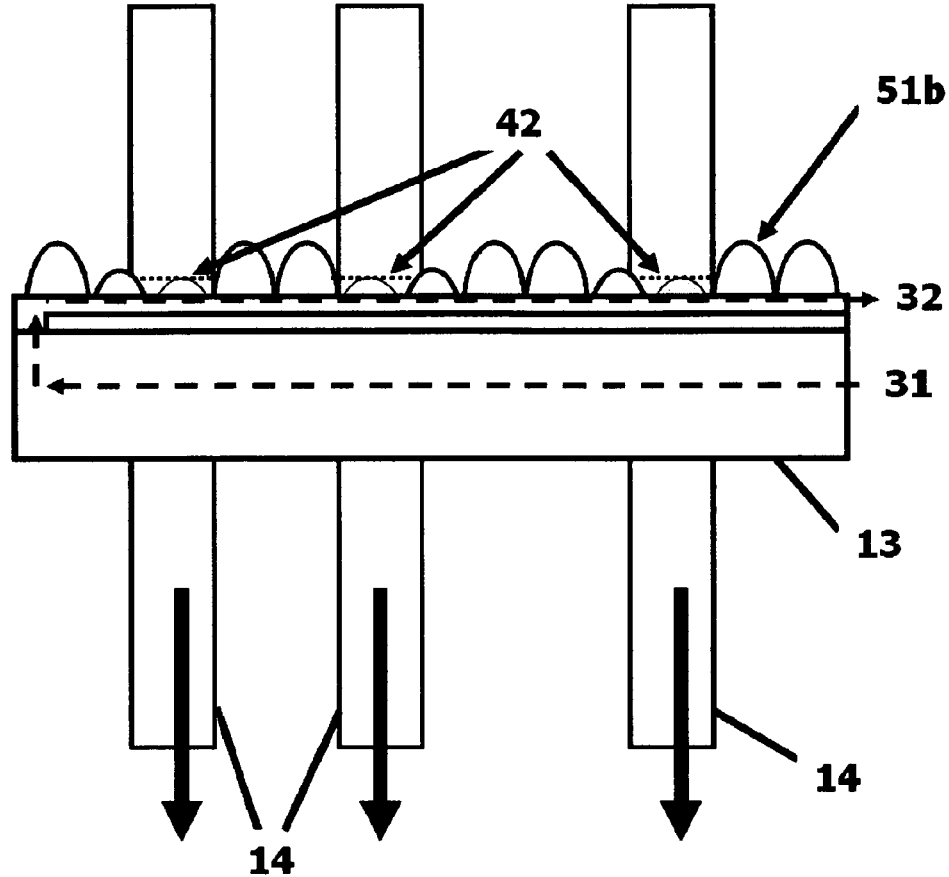
FIG. 7. is a schematic representation of a lower rod of a retail display hanger of FIG. 6 with items hanging on various pressure points.

Referring now to FIG. 7, the same lower rod 13 segment is shown as in FIG. 6 but showing the presence of items 14 pressing down on certain conical points under each item. Note that the illustrations in FIGS. 6 and 7 are not to scale but for purposes of illustration only.

It is a valuable electrical phenomenon that if the bottom layer of strip 21 has a standalone resistance of x ohms and the top layer has a standalone resistance of y ohms, where y<x, the sensitivity of the parallel x+y strip 21 is greater than either x or y alone.

Using this observed principal multi-layer strips 21 can be manufactured according to a variety of electric conductive ink resistive formulations and sensor geometry to achieve a full spectrum of pressure sensitivity thus allowing the disclosed invention to achieve recognition of items 14 measured in sub-ounce to significant heavy weights. An item hanger surface composed of such multi-layer strips 21 enables a wide spectrum of fabrication that is most valuable in meeting the wide variety of real world inventory monitoring and tracking problems.

As has been taught in the disclosure for the item hanger the analog type electric conductive ink materials can be shaped and crafted to yield a full spectrum of highly useful item 14 monitoring item hanger or suspended products of significant utility to a wide range of application users. Without changing the intent and scope of the disclosure herein alternative materials to the disclosed embodiments of analog type electric conductive ink strip and design such as a series resistor network embodiment can be used to implement and achieve the disclosed measurement and sensitivity performance. Other types and arrangements of item hanger sensors including but not limited to series and/or parallel resistor network functional configurations, or combination of both, and other techniques for attaching the sensor unit to the item hanger such as, but not limited to, flexible screen printed substrate with sensor patterns, capacitive type sensors and other such, will be apparent to those skilled in the art.

Figure 8:
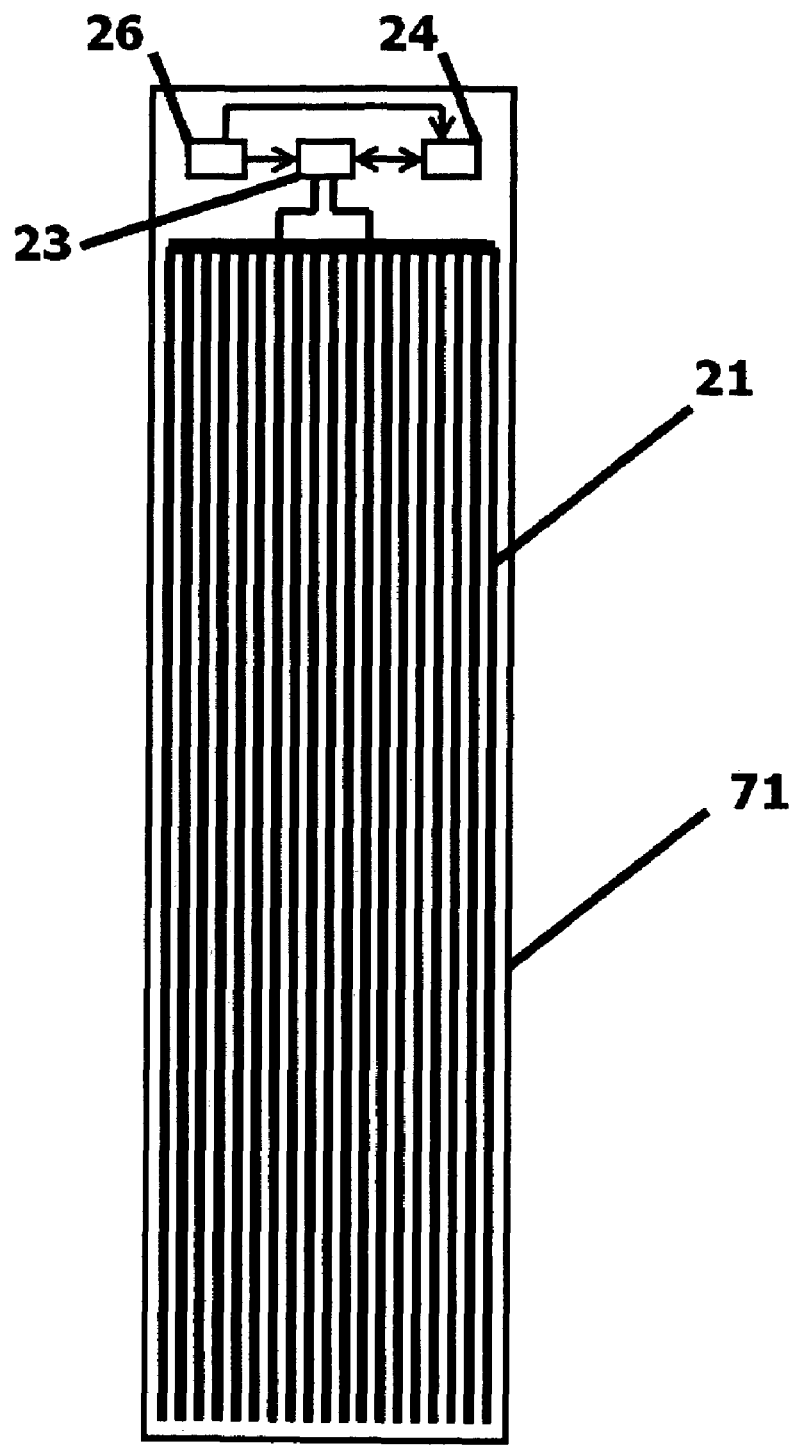
FIG. 8 is a plan view of a two-dimensional surface sensor in accordance with one embodiment of the present invention.

The hanger embodiment of the item monitoring system disclosed above is a linear application for said strip sensor 21. Referring now to FIG. 8, a second embodiment is disclosed for detecting items placed upon a shelf or other surface that includes two or more of said contiguous strip sensors 21 that are placed in a side-by-side generally parallel relationship on a surface topside 71 such as a PET or Kapton® film thus defining a two-dimensional surface analog type resistor network embodiment for monitoring a plurality of different item types, each type of which may from zero to a plurality of items 14 on the generally flat shelf surface.

Like the sensing unit of the hanger embodiment, each strip sensor 21 may comprise a plurality of pressure sensitive resistors arranged in series or parallel. In one embodiment, each strip sensor generally extends from the front of the shelf to the rear of the shelf with a plurality of strip sensors being generally arranged side-by-side. For example, the two-dimensional surface may have an angled configuration such as in a freezer for frozen foods with the strip sensors extending front to back along the angled surface.

For each strip sensor, the multiplicity of resistors may be arranged in parallel connections in one embodiment. Moreover, the resistors have a variable resistance that changes depending upon a force or pressure placed upon the resistors, such as from an item being set upon the shelf or other surface. In one example, the resistors include a top conductive trace and a bottom conductive trace that are separated by a pressure sensitive material having a conductivity that varies from insulating to quite conductive in response to applied force. In the absence of any applied force, such as in the absence of any item sitting upon the shelf, the pressure sensitive material essentially provides an infinite resistance. Upon the application of force, such as in response to an item being set upon the shelf, however, the pressure sensitive material becomes at least partially conductive, thereby completing the circuit between the upper and lower conductive traces and creating a resistor network with some value less than infinity with the value of the resistance generally decreasing as the force applied to the resistor increases.

Figures 9A, 9B, 9C, 9D, 9E:
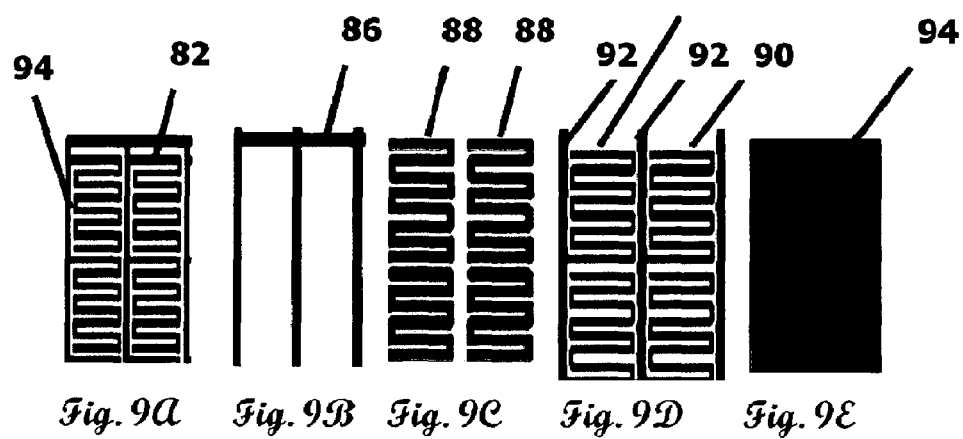
FIGS. 9A-9E are plan views of the different patterns that are sequentially printed to form a sensor unit having a parallel configuration in accordance with one embodiment of the present invention.
Figure 10:
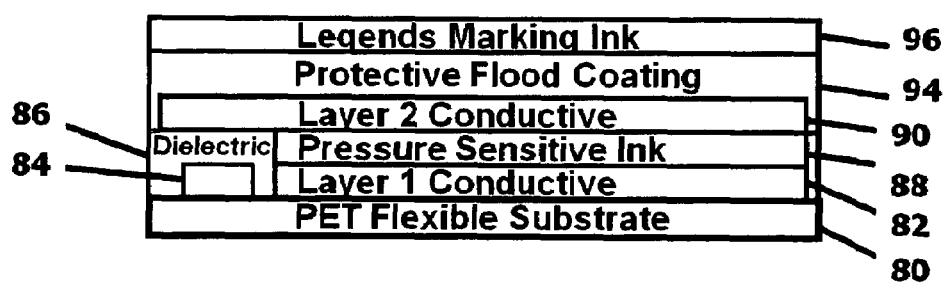
FIG. 10 is a cross-sectional representation of a sensor unit fabricated in accordance with the sequential printing steps depicted in FIGS. 9A-9E pursuant to one embodiment of the present invention.

Each strip sensor may be fabricated in various manners, but in one embodiment, the conductive traces and the pressure sensitive material are deposited by a sequential screen printing process or printed according to another multi-layer printing process. For example, the bottom conductive trace may be deposited upon an insulative substrate 80 as shown in FIGS. 9A and 10. The bottom conductive trace may be formed of various conductive materials, but is typically formed of conductive silver ink such as Creative Materials' 112-15 or the like. The substrate can also be formed of various insulative materials, but is typically formed of a flexible material, such as PET or Kapton™ that has been or is resistive to heat shrinkage associated with curing screen printed inks.

As shown in FIGS. 9A and 10, the bottom conductive traces generally define a plurality of sinuous patterns 82 arranged in a columnar fashion; two of which are depicted. Although one particular sinuous pattern is shown, the bottom conductive traces can define other sinuous patterns or other non-sinuous patterns, if so desired. For each column and, therefore, for each strip sensor, the bottom conductive trace of this embodiment also defines a common signal or power line 84 that is electrically connected to each sinuous pattern, such as at one end thereof. This signal line can therefore be utilized to provide current to each of the sinuous patterns in a column, each of which will form a portion of a respective resistor that is arranged in parallel with the other resistors in the same column. In other embodiments, the signal line may be deposited on the backside of the substrate with connections made to the bottom conductive traces of the various resistors by means of respective conductive vias.

Although not necessary for the practice of the present invention, a dielectric material 86, such as Creative Materials' 120-17 may then be deposited, such as by screen printing, over the signal lines 84 such that return A/D lines can be stacked on top of the signal lines as described below, thereby conserving real estate and permitting a greater percentage of the substrate 80 to carry pressure sensitive resistors for improved item detection. In this regard and relative to the pattern of the bottom conductive traces shown in FIG. 9A, a representative pattern of dielectric material that is deposited upon the signal lines is shown in FIGS. 9B and 10. A pressure sensitive material 88, such as Creative Materials' 118-44 or variations thereof, is then deposited over the sinuous patterns 82 defined by the bottom conductive trace. Relative to the pattern of the bottom conductive traces shown in FIG. 9A, a representative pattern of pressure sensitive material that is deposited upon the bottom conductive traces is shown in FIGS. 9C and 10. Thereafter, the top conductive trace is screen printed upon the pressure sensitive material so as to overlie the bottom conductive trace, as shown in FIGS. 9D and 10 in relation to the foregoing deposition patterns depicted in FIGS. 9A-9C. As with the bottom conductive trace, the top conductive trace may be formed of various conductive materials, such as Conductive Materials' 120-17 conductive silver ink. According to the illustrated embodiment, the top conductive trace also defines a plurality of sinuous patterns 90 arranged in a columnar fashion so as to overlie corresponding sinuous patterns defined by the bottom conductive trace and the pressure sensitive material. Since the top conductive trace advantageously overlies the bottom conductive trace, the top conductive trace can also define different sinuous patterns or non-sinuous patterns if the bottom conductive trace likewise defines the same patterns. The top conductive trace also defines a return A/D signal line 92 connected to each sinuous pattern in a respective column, such as at one end of the sinuous pattern and, more particularly, at the opposite end of the sinuous pattern as the end at which the signal line makes contact with the corresponding sinuous pattern defined by the bottom conductive trace. In embodiments in which a dielectric material has been deposited over the signal line, the return A/D signal line may be deposited on the dielectric material so as to overlie the bottom conductive trace, thereby minimizing overhead area and maximizing sensor surface area. Alternatively, the return A/D signal line may be deposited elsewhere on the substrate, or on the backside thereof with appropriate electrical connections established by means of conductive vias. A protective or flood coating 94, such as Creative Materials' 120-17, the same dielectric that may cover the signal line, may be applied over the top conductive trace as shown in FIGS. 9E and 10 and, if desired, markings 96, such as various legends, logos, advertisements or other markings, can be silk screened or other otherwise printed upon the protective coating.

In operation, a signal, such as a predefined current is applied to the respective signal line for each strip sensor, i.e., each column of resistors, and the respective return line is monitored, such as by a microcontroller following conversion to a digital value by an A/D converter as described above. In the absence of any items on the shelf, all of the resistors essentially have an infinite resistance and appear as open circuits as a result of the pressure sensitive material such that no signal or a very small signal is returned to the microcontroller. When force is applied to one or more variable or analog type resistors in a strip sensor, the pressure sensitive material becomes partially conductive, thereby electrically connecting the sinuous patterns defined by the top and bottom traces that underlie the item such that a larger signal is returned to the microcontroller with the magnitude of the signal being proportional to the cumulative force applied to the column of resistors as a result of the parallel network arrangement of the columnar resistors between the signal and return line. As such, a measure of the number of items overlying a particular strip sensor is provided. This measure may, in turn, be communicated by the communications unit 24 to a central host 50 as depicted in FIG. 5. However, the strip sensor generally does not provide any indication as to the position of the item(s) in the column, i.e., no indication is provided as to whether the items are toward the front or rear of the shelf.

The strip sensors may be fabricated in alternative manners. For example, first and second conductive traces can be laid down upon a common substrate. The first and second conductive traces can again define a plurality of sinuous patterns arranged in a columnar fashion with one of the conductive traces electrically connected to a common signal line and the other of the conductive traces electrically connected to a common return line. However, the first and second conductive traces are electrically independent of one another, such as by being disposed side-by-side on the substrate without direct electrical connection therebetween. The substrate and the conductive traces of this embodiment may be covered with a conductive foam, such as a carbon loaded filter foam that is processed to bond the carbon to the foam, that is isolative in the absence of any applied force, but that electrically connects the first and second conductive traces if force is applied to the conductive foam, such as by placing an item thereupon. The resisivity of the conductive foam varies based upon the applied force such that the strip sensor can obtain a measure of the number of items that overlie the strip sensor based upon the magnitude of the return signal as described above. As also described above, the conductive foam may be covered with a protective coating that may, in turn, be screen printed with various markings for advertisements or the like with the resultant two surfaces being laminated to form the final surface senor product.

As mentioned above, the item monitoring system of this embodiment may also have a microcontroller 23 or other type of processing element. In the following description, the microcontroller will be described to have a number of A/D inputs and outputs capable of receiving and producing signals that are converted internally to corresponding digital signals. Alternatively, an external A/D converter may be employed if desired. The microcontroller may be disposed on the surface topside or elsewhere if so desired. Regardless of its physical location, the microcontroller advantageously separately communicates with each strip sensor, i.e., each column of resistors.

For a microcontroller having a plurality of digital outputs and a plurality of A/D inputs, each digital output may be connected to a plurality of strip sensors that equal in number the number of A/D inputs of the microcontroller. Thus, each of the strip sensors that have a signal line connected to the same digital output has a return line connected to a different A/D input of the microcontroller such that each strip sensor may be separately monitored.

The foregoing configuration scales to the number of available microcontroller digital outputs and A/D inputs that are available. For example, the design disclosed can monitor a storage shelf with up to N×M sensor strips 21 where N is the number of available digital output pins and M is the number of available A/D input pins to selectively sense each sensor strip 21. In the case of the Microchip PIC18F252-I/SP microcontroller, for example, there are 5 A/D input pins and 9 digital output pins enabling a set of 45 sensor strips 21 to be individually controlled and monitored. PIC micro-controllers are currently available with up to 16 A/D input pins and 44 digital output pins enabling a set of 704 sensor strips 21 to be controlled and monitored. In the future, microcontrollers with even more input and output pins will likely be available or other means, such as multiplexors or the like, may be employed to increase the effective number of pins, if desired. Assuming each sensor strip 21 has a width of 0.25", a PIC18F8720-I/PT micro-controller could individually monitor and control the strip sensors that would cover approximately 14.5 linear feet of a shelf or other surface. In a retail environment if a 2" wide produce package is assumed then one storage surface could monitor up to 87 unique item types (6 items per foot×14.5 feet) assuming there is one column of each unique item. The depth of the storage shelf and correspondingly the length of each strip sensor, i.e., each column of resistors, determines the limit of the number of items per type in a column if items. Moreover, the item monitoring system of the present invention allows for stacked items during the training process such that the total number of inventory items that could be monitored in real-time could exceed 1,000 on one 14.5' wide storage surface. With respect to stacked items, for example, the item monitoring system may be employed in beverage dispensers in which the items are stacked vertically upon a support surface.

It is noted that the parallel configuration of resistors in each strip sensor is well suited for volume screen printing production runs of one-sided two-dimensional surfaces of varying dimensions without fundamental circuit design changes since only the number of connecting traces and the associated sensor strips 21 vary per shelf space coverage required. Further when using a PET, Kapton® or other flexible substrate, a plurality of strip sensors may be printed on the substrate, the microcontroller and communication unit may be mounted upon the substrate and appropriately connected to one another and to the strip sensors, the item monitoring system may be tested and then rolled up for packaging, shipping and storage. The production flexible storage shelf monitoring product can have an adhesive with peel off protective covering added to the backside of the substrate (opposite the strip sensors) to facilitate attachment to a physical shelf or other surface. Before installation the substrate can be trimmed on the right to accommodate the physical shelf length and along the front to fit the shelf dimensions without altering the performance of any of the remaining strip sensors due to their parallel network arrangement.

As disclosed for the hanger embodiment, the geometric configuration of the sensor strip 21 is a consideration in defining strip 21 sensitivity. In the case of the rounded hanger lower rod 13 only the upper portion of the rod where items 14 are suspended need carry the sensor strip 21. It is further disclosed that the strip sensor may have a sharply rounded or even triangular profile at the point of contact for improved sensitivity. The basic design guideline is that up to a limit, determined by the rigidity of the packaging material for the item and overall safety issues, the smaller the sensor contact area between the item 14 and the strip sensor 21, the greater the sensitivity of the strip sensor. This is a well known principal related to a pressure of an object on a surface as measured in the size of the area supporting the weight of the object. A common example is a lady's high heel shoe. The heel area being very small results in an enormous standardized weight per unit of area measurement (e.g., pounds/sq. in. or kg/sq. cm).

A similar principle may be applied by a designer when creating a two-dimensional surface defined by a plurality of generally parallel sensor strips 21. If the spacing between the sensor strips 21 is close, for example every ¼" apart, then an item 14 packaged in a 2" wide box will touch at least seven and perhaps 8 sensor strips 21 if the object is aligned parallel to the strips 21. As such, at this high density of ¼" resolution per sensor strip 21, the weight of the item 14 is potentially distributed across all 7 or 8 sensor strips 21 supporting the item 14. Thus a 2 oz item 14 actually causes $\frac{1}{8}^{th}$ of the total weight of 2 oz to be applied to each sensor strip 21. Assuming that the sensor strips 21 are designed to be sensitive and responsive to changes in the applied force of ¼ oz or less, then all eight sensor strips 21 will yield a measurable change as represented by each of the eight A/D inputs to the microcontroller when the item 14 is added or removed from the storage surface. The cumulative total of the change caused by item 14 is an important desired calculated value by the microcontroller 23.

As disclosed above for the hanger, a two-dimensional surface is also trained by example. In this case of a 2" wide single item 14 being placed to the far left and forward on the available sensor storage area, the microcontroller 23 senses change in the resistance of eight of the strips that correspond to where the item 14 is placed. A confirmation may be obtained by repositioning item 14 and monitoring subsequent changes in the readings of the effected strip sensors which should result in the generally same cumulative change as noted during the first training for the item 14. Note that the item monitoring system is capable of detecting any number of items 14 resting upon one or a plurality of sensor strips 21. As such, when the microcontroller notes a change in the A/D inputs, the microcontroller 23 is looking to determine the cumulative change from the last stored sensor measurements across the sensor strips 21. As detailed in the software flowchart, the monitoring process primarily involves addition and subtraction and therefore only has relatively minimal computational requirements. In this regard, addition and subtraction play a primary role in recognizing changes in the readings provided by the sensor strips simply by comparing new readings provided by each sensor strip 21 with that stored and then storing the net change. Repeating this sensor measurement for all sensor strips 21 there will be a set of x, in the example up to 8, sensor strips 21 that experience changes that total to the pressure change attributable to one (1) item 14 as defined during the training process and as identified by the type/package/UPC code of the item. One skilled in the art recognizes the application of digital signal processing techniques can further enhance the sensing results as applied to recognition of a plurality of item 14 touching the strips 21.

Figure 11:
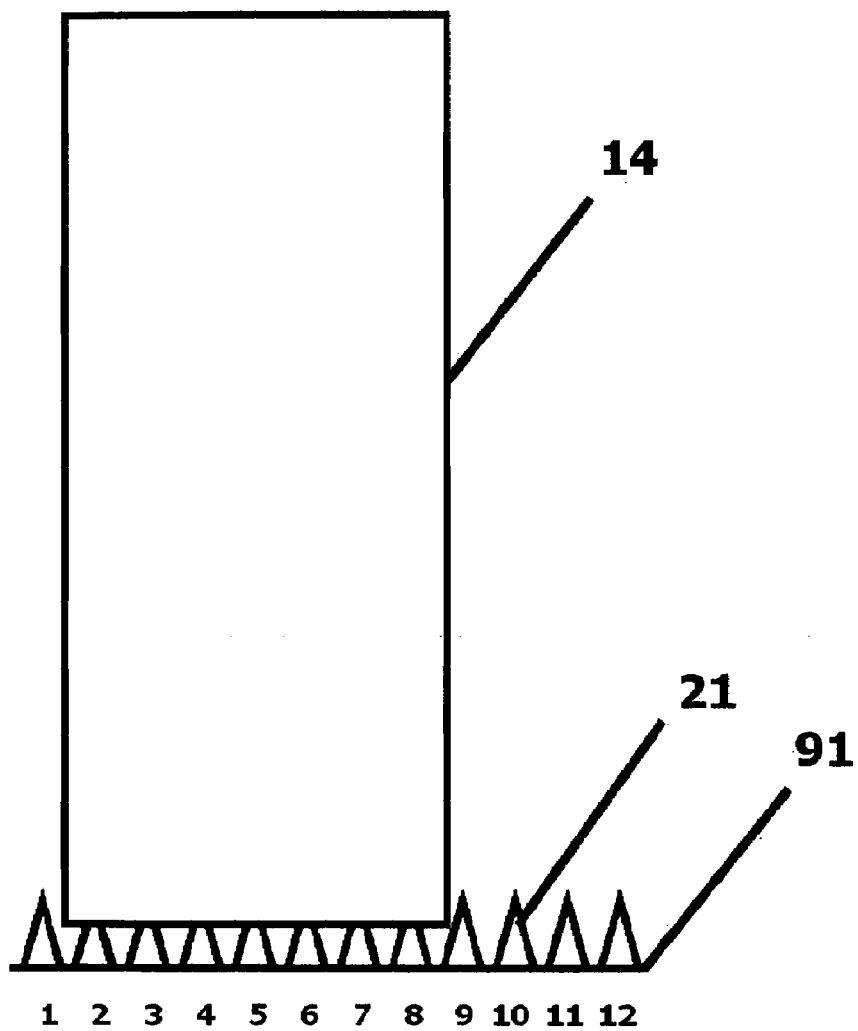
FIG. 11 is a schematic representation from one edge of a surface sensor of FIG. 8 with an item disposed thereupon.

Referring to FIG. 11, the end view shows a set of sensor strips 21 with an item 14 touching seven strips 21. Note that the change in the readings provided by the sensor strips only occurs in the sensor strips 21 where the item 14 is applying pressure approximately at $\frac{1}{7}^{th}$ of the weight of the item 14 which is 2 ounces in this example, assuming a consistent surface contact by item 14 on each sensor strip 21. For purposes of example, presume that the readings provided by the sensor strips 21 without an item 14 are 250 while those same readings with item 14 present are 225. Then the total change by the presence of item 14 over the seven affected strips is 25×7 or 175 that relates to the item 14 weight of 2 ounces. It is important to note that should the weight press unevenly across the strips the summation of changes will yield the expected end value as if evenly distributed.

Figure 12:
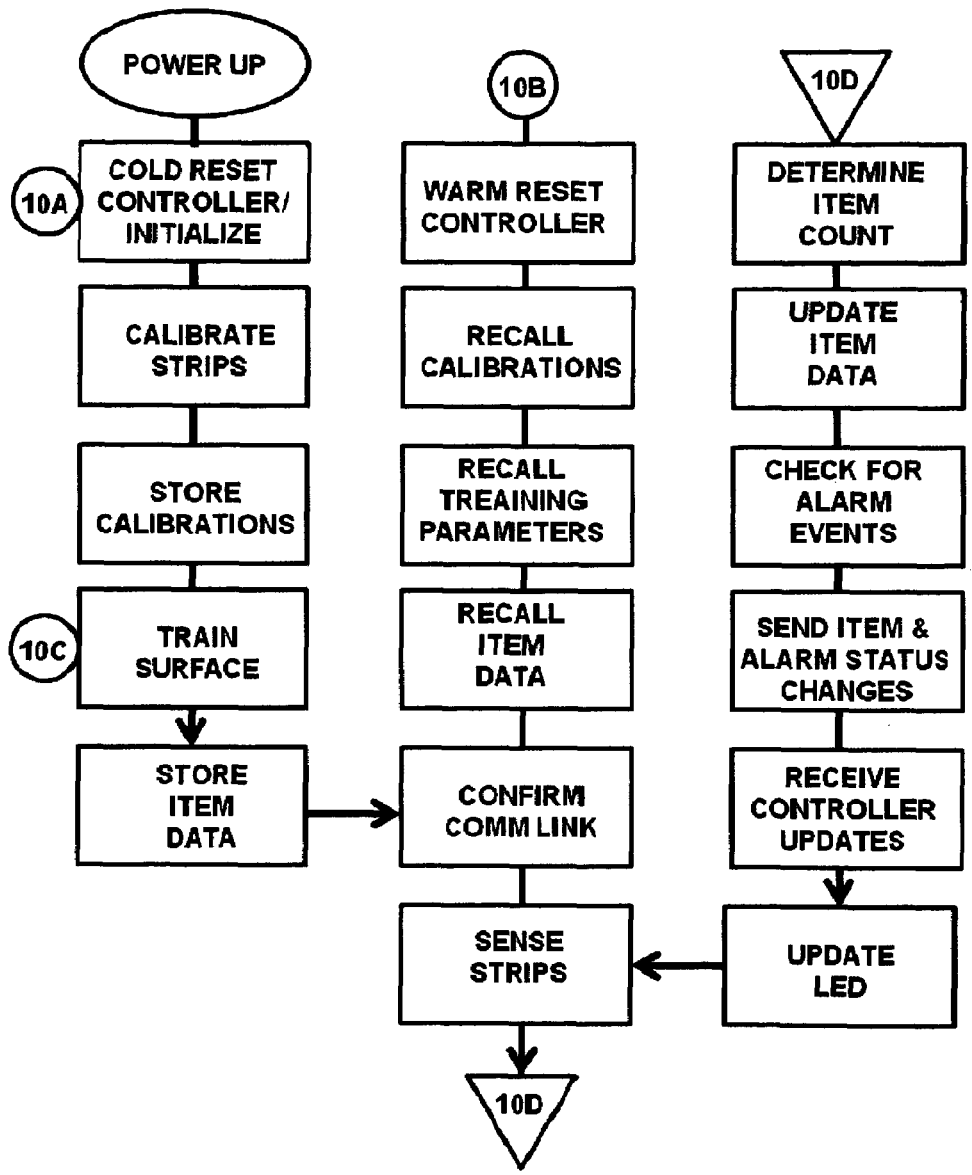
FIG. 12 is a flow chart depicting operations performed, such as by a processing element, in accordance with one embodiment of the present invention.

FIG. 12 presents a flow chart of one embodiment of the operations performed by the microcontroller 23 or other processing element for either a series and/or parallel resistor network embodiment. Obviously, other flows could be established depending upon the design requirements without departing from the spirit and scope of the present invention. By way of example, however, entry to the program logic flow in this embodiment occurs at three points: i) first time power up, ii) cold reset 10A and iii) warm reset 10B.

Effectively the first time power up program steps, initiated when power is first applied to the microcontroller 23 as determined by a check of a stored variable, and the cold reset 10A steps initiated by either hardware switch or a reset message transmitted via communication link from a hand held device, are recognized by the microcontroller 23 which then initializes the data variables and array space to a known set of reference data values. The function to be achieved is to create a known reference point for an empty surface that is calibrated to the full range of the A/D inputs, e.g., an 8-bit or 10-bit data range where a high value (e.g., 255 for an 8-bit A/D) equates to an empty, high resistance strip condition.

After cold reset 10A (or first power up) the microcontroller 23 next determines the number and initial sensor values of each sensor strip 21 being monitored. In the case of the single strip hanger (see FIG. 2) there is only one sensor strip being monitored. In the case of the surface there is a plurality of sensor strips (see FIG. 8).

Calibrating each sensor strip 21 is accomplished by applying a known reference signal to the selected strip 21 or set of strips 82 on surface 71 with the first of some number of output pins of the microcontroller 23. This in turn sources a signal to the hanger resister strip 21 as disclosed in FIG. 3 for the hanger embodiment or a set of sensor strips 81 in the shelf embodiment as shown in FIG. 8. The microcontroller receives each return signal 32, i.e., a single return signal for the sensor strip of the hanger embodiment, or a plurality of return signals that are provided via different ones of the A/D input pins of the microcontroller 23. The microcontroller then stores each returned signal for future reference as the base calibration value when no item is touching the sensor strip 21.

Once this process is completed, the microcontroller 23 has one reference value for each sensor strip 21 as defined during the calibration process. As one knowledgeable in the art will recognize this process enables said microcontroller 23 to self configure to whatever the number of strips 21 are being monitored from a single hanger strip 21 to a maximum set x (output pin count) times y (A/D input pin count) as designed and implemented for a two-dimensional surface layout.

A more extensive calibration process can be performed either at the factory or in the field to determine the linearity of each strip. If this option is selected at either first power up or cold start then the microcontroller 23 will expect an additional ordered set of sensor readings in response to placement of a reference item 14 of a known weight upon the strip sensor(s) where the weight of the reference item can be selected to fall within the upper and lower limits of the sensor's ratings. In this case the microcontroller 23 repeatedly obtains a reading from the sensor strip(s) until the microcontroller either finds a different signal (representing a reference item 14 touching the surface) or it times out (after the determined number of calibration points are taken). The calibration process begins with placement of the reference item 14 at a selected point where it remains long enough to insure detection and then it is removed long enough to insure recognition of return to the initial status when no reference item 14 was touching the sensor strip. Then the item 14 is moved along the strip 21 and placed in different positions along the length of the sensor strip long enough to insure detection and so forth. By moving reference item 14 along an ordered set of test points the microcontroller 23 gathers a set of signal readings. Once a predetermined time out period such as 30 or 60 seconds has lapsed the microcontroller 23 calculates the average and deviations for the reference test points. If they fall within an acceptable deviation range the strip 21 is known to be relatively linear over the entire length. The deviation value is then also stored (not to be erased at power up or cold reset) for future reference for that strip 21 during training as well as during active monitoring of item data.

The above calibration and deviation testing can be part of the factory quality control process to accept or reject strip sensors, be it for a hanger embodiment of a shelf embodiment, such that production products that are delivered "calibrated" with deviation data stored in FLASH memory for long term reference. Each strip 21 is now ready for item training.

Warm reset 10B occurs when there is a halt in the microcontroller control program either by design, automatic restart after loss of all power or unintended program flow error. The warm reset 10B serves to reset said microcontroller 23 to an operational status without requiring recalibration, retraining and without loss of current item count and status data.

On warm reset 10B the microcontroller 23 recognizes that it is already configured by checking a variable generally stored in a FLASH memory that contains the date, or some other variable, other than the cold start 10A initialized value. Recognizing the stored variable (not in reset condition) the microcontroller 23 knows it is to warm reset and loads program pointers to prior status to recall calibration, training and current item count and status data.

Training for an item hanger 14 begins with a signal 10C to the microcontroller 23 that launches the training process program steps. In one embodiment for training the microcontroller 23 there is a hanger with a single sensor strip 21. The signal 10C can originate from a message from a hand held unit that is received by the microcontroller 23.

The microcontroller 23 then signals that it is ready to be trained by sending a return message to the trainer's hand held unit that it is ready for the first item 14. The trainer then places one (1) item 14 such that it is touching the sensor strip of the hanger. The microcontroller 23 begins a sensor cycle for the sensor strip 21 and continues until it confirms a change in the reading(s) provided by the strip 21 over a predetermined lapsed period such as one (1) second. At that point the microcontroller 23 signals via a message to the hand held unit that it recognizes one (1) of the new item 14.

In the case of the hanger embodiment, a plurality of items 14, i.e., the reordering quantity (the quantity of items that would trigger a restocking request) may be hung from the hanger following recognition of the single item 14. In the case of a parallel resistor network embodiment, a second item 14 may be placed to aid in training the microcontroller 23 before loading with the reordering quantity and subsequent maximum number of item 14 to better establish the +/− variances for the sensor strip or strips. Next a plurality of items 14 equaling the reordering quantity is loaded and the microcontroller 23 determines and saves that value or set of values by strip or cumulatively as directed. When finished loading the hanger with the restocking quantity number of items, the microcontroller 23 will confirm after waiting an agreed period of time, 5 seconds for example, after the last change was detected and the microcontroller 23 will send a message to the hand held unit of the number of items now hung from the hanger Lastly the maximum number of desired item 14 are hung from the hanger with the microcontroller 23 repeating the process as for the reorder quantity above. The microcontroller can determine the number of items in each case by dividing the change in resistance by the change in resistance attributable to hanging a single item from the hanger and applying the appropriate Ohm's Law calculation.

At this point, the barcode identification of the item 14 can be read if available or an identification of the item may be key entered and stored in the hand held unit or other device. Since the hand held unit knows the hanger identification number (transmitted by the microcontroller to the hand held unit during the setup (cold and warm restart)), the count and the barcode identification of the item 14, the set of data is then relayed either by the hand held unit or via a communications network associated with the hanger to a central host 50 for storage. For example, the hand held unit may provide the set of data to the communications unit 24 of the item monitoring system which then relays the set of data to the central host 50. The microcontroller 23 then finalizes its item 14 training data and stores it for future reference. To aid in the linking of data to a sensor surface a barcode can be affixed or printed to the sensor surface that is read by the hand held unit during the training process and relayed to the central host for storage.

For a two-dimensional surface the same logical process is implemented with the added consideration that the readings provided by a plurality of sensor strips 21 on surface 71 may change when item 14 is touching the surface. In this case more than one strip 21 will change when said item 14 is first placed on the shelf, such as on the front left most available strips 21 on surface 71. As such the microcontroller 23 will detect two or more strips 21 that change values at the same time. The strips 21 on surface 71 with changed data may or may not be sequential, side-by-side given the various footprints possible for item shapes.

The microcontroller 23 signals it is ready to be trained by sending a message to the trainer's hand held unit that it is ready for the first (or next new) item 14. The trainer then places one (1) item 14 on the shelf such as in the front leftmost available location (e.g., the left most strip 21 on surface 71) when first starting. The microcontroller 23 begins to read the sensor strips 21 and continues until it either confirms that a sensor strip has a changed reading(s) that remains over a predetermined lapsed period such as one (1) second. At this point the microcontroller 23 signals via a message to the hand held unit that it recognizes one (1) of the new item 14.

Having identified the strips 21 with changed values, the microcontroller 23 then performs a summing operation of the changes in the sensor readings over all of the sensor strips having a reading that changed. The resultant cumulative value represents the presence of one (1) item 14. The microcontroller 23 then stores the cumulative value and the range of sensor strips that changed. The combination defines the presence and the product footprint width (e.g., number of strips touched when present in a generally columnar arrangement) associated with the item. Next a quantity of item 14 is placed in a columnar manner behind and/or beside and/or stacked as needed to define the reorder number for the item 14 type. When finished loading the surface with the reorder number of the item, the microcontroller 23 will confirm after waiting an agreed period of time, 5 seconds for example, after the last change was detected by message to the hand held unit of the number of items that are upon the shelf Thereafter, the maximum number of the item is placed in a row and column manner. When finished loading the surface with the maximum number of the item, the microcontroller 23 will confirm after waiting an agreed period of time, 5 seconds for example, after the last change was detected by message to the hand held unit the number of items that are upon the shelf. Note that items 14 can be in multiple rows and columns and stacked one item 14 on top of another item 14 for k levels within the definition of summing to determine total item count.

At this point using a hand held or similar device, the barcode identification of the item 14 if available is read or an identification of the item is key entered, and stored in the hand held device. Since the hand held device knows the surface identification (generally provided by the microcontroller 23 during setup (cold and warm restart)), the count and the barcode identification of the item 14, the set of data is then relayed either by the hand held device or via communications unit associated with the microcontroller to a central host for storage. Item single and full load count data, foot print data and relative location of strips is stored by said microcontroller 23 for future reference. Identification of the item 14 can be originated at the initial training step for the item 14.

The training process is then repeated for each new item 14 to be monitored on the surface 71 by said microcontroller 23. When all training is completed and there are no new items 14 to add to the surface 71a distinct signal is given using the push button switch 10C and/or a message from the hand held unit that this training session is completed. The microcontroller 23 then finalizes its item training data and stores it for future reference.

At this point microcontroller 23 has stored and available calibration data, training parameters and current item data for each sensor strip. The microcontroller 23 proceeds to monitor the sensor strips 21 in a cycle defined by the particular application such as at fixed intervals, adaptive to hours of operation (e.g., not repeating as often during store closed hours) or randomized at various intervals where added security is an important objective.

Advantageously, item counts can be simply determined using the contiguous sensor strips 21. This simplicity requires a minimum calculation capacity of the micro-controller to programmatically implement.

As one skilled in the art knows there are two basic resistor network formulas under Ohm's Law. One is for a series resistor network and the other is for a parallel resistor network. If strip 21 is implemented as a "series" resistor network as described above in conjunction with the hanger embodiment then the change in resistance of the pressure sensitive ink attributable to each individual item is cumulative and decreases from the reference value (since the resistivity of the pressure sensitive ink decreases with applied force). Thus if one item 14 causes a change of 25 milli-volt in the reading from a sensor strip 21 from a reference value of perhaps 200, the presence of two items 14 touching the strip 21 will cause approximately a 50 millivolt change in the reading provided by the sensor strip 21. The values are for illustration purposes only.

In this series resistor network, the microcontroller 23 takes the reference change for the training item 14 and divides it into the cumulative change sensed for strip 21. In the example above, the cumulative change of 50 divided by the reference item change of 25 determines that there are two items 14 touching the strip 21.

Though more mathematically complex the parallel resistor network sensor design can offer some further advantages. As one skilled in the art knows according to Ohm's Law a parallel resistor network change value is computed by the value of one for the numerator and a value for the denominator of the sum of the fractions formed by one over each individual resistor change. Thus in the example above where the reference item change is 25 (e.g., $1/(1/25)$) the change in a parallel resistor network that is brought about by placement of a second item would be computed as $1/(\frac{1}{25}+\frac{1}{25})$ for a recognized change of 12.5, for placement of a third item 14 the measured change would be 8.33, for placement of a fourth item 14 the measured change would be 6.25 and for placement of a fifth item 14 the measured change would be 5. All values subject to variations in strip calibration variables and physical differences in placement of each item 14.

While determining item counts on a series resistor network is relatively direct, the microcontroller of the embodiment having a parallel resistor network could pre-compute the item values for the range expected using Ohm's Law for parallel resistor networks, with the microcontroller 23 storing the set of values to speed recognition of individual changes to be monitored.

In the case of a two-dimensional surface 71 the totalized changes for each sensor strip contacted by the item 14 represent the distributed pressure on the strips 21. In this case the microcontroller 23 has sensed all strips that changed due to the presence of item 14 and then added the change in the readings provided by all of the strips 21 during training as well as noting the change in the readings provided by individual strips 21. Following Ohm's Law for parallel networks the change in the readings for each new item is treated as a single value thus reverting to the example of a single strip 21 described above. As one skilled in the art will recognize a more exact calculation can be performed to take into consideration the individual strip calibration values, relative positioning of item 14 across the neighboring strip 21 in one direction while not touching the prior strip 21 on the other side of the item, etc. without departing from the spirit and scope of the present invention. For example, if an item 14 normally resides on 8 contiguous strips with no change on either adjacent strip and a "shifted" new item 14 is placed such that 7 of the 8 change and one of the contiguous adjacent strips then a more advanced calculation will recognize that a new item 14 for the item 14 column has been placed but is shifted to one side by 1 strip.

Advantageously, the linear sensor for a hanger (see FIG. 2) and a two-dimensional surface (see FIG. 7) requires only a relatively straightforward monitoring of a single strip in the hanger embodiment or the number of strips on the two-dimensional surface 71 rather than a more computationally intensive method to monitor a grid of two-dimensional sensors as in the case where discrete pressure sensors are used. The single contiguous strip is also less expensive to manufacture and maintain than two-dimensional grids of discrete pressure sensors.

The microcontroller 23 stores each change in the item count from a prior item count. Based on application instructions, should it be of interest to monitor gross changes over a short period of time, the microcontroller 23 could store a recent set of changes rather than a single change event. In the case of a "sweep" of product off a hanger or shelf where multiples are removed within a short period of time measured perhaps in seconds, then the microcontroller 23 could be instructed to generate an alarm condition for communication to the coordinating microcontroller and, in turn, for the communication unit to report to the central host 50. The central host can alert store management and/or activate appropriate surveillance equipment 54 such as cameras or the like. As such, shoplifting may be averted before the thief exits the store.

Additionally, during the update of item data a condition can happen where it is clear a change has occurred but the sensed value does not fit either the computation predicted for a specific count of the item anticipated to be on the shelf, even allowing for deviations based on the calibration data. In such a case an alarm notification could be sent from the processing element 23 to the central host 50 to note the possibility that a different item 14 has been placed on the hanger or shelf. Often one type of item can be incorrectly restocked to another, wrong location by a customer to sit until accidental discovery. Take the case where a frozen meat item in a grocery store is placed by an uncaring customer in the cereal section when determined unwanted where it would simply thaw and spoil if the problem is not immediately corrected. The damage caused by such an event is not only spoilage of the meat but also potential damage to the cereals in the vicinity. The central host 50 may therefore generate an alarm notice directing store personnel to visit the cereal section in question would direct store employee attention to the specific shelf location in question once the item monitoring system of the present invention detects the presence of a different item than that for which the strip sensors are designed. The alarm can be turned off either by removal of the incorrect item 14 or manually by store employee using a hand held terminal or a built-in means on the hanger or shelf such as a push button according to a store defined pattern.

In one embodiment depicted schematically in FIG. 5, the item monitoring system for each hanger (FIG. 3) and shelf (FIG. 7) would be in communication with a local or remotely located central host 50, such as a server or other computing device, that maintains a central database 52 that tracks all item counts as well as other status and location data. One communication technique is to hard wire the microcontroller of each item monitoring system for each hanger or shelf to the central host using a well-known RS-485 multi-drop network. This is not often practical in large retail locations. Another more flexible communication technique is to include a dedicated RF communication unit with each item monitoring system so as to communicate with both the microcontroller 23 and the central host. Yet another method is for a plurality of item monitoring systems with respective microcontrollers to share a RF communications unit that is locally linked to the various microcontrollers by hardwire, such as via a common bus that extends between and communicably connects different item monitoring systems, or secondary frequency short range RF links. The resultant shared RF communication unit is more cost effective vis a vis the embodiment in which each item monitoring system includes a dedicated RF communications unit. Similarly, a plurality of item monitoring systems can share a processing element that is in communication with each item monitoring system via a bus that extends between the item monitoring systems. By extending between item monitoring systems, the buses extend across different substrates, each of which also carries one or more sensor strips. The buses carried by the different substrates may be connected in various manners including by means of a conductive tab that is applied, much in the same manner as a band-aid due to the adhesive backing, to the respective ends of the buses so as to bridge from one substrate to another.

One skilled in the art will also recognize that the specific method of communications selected is not critical to the novelty of the disclosed contiguous sensor strips and such communications may be implemented as dictated by each individual application site needs and constraints. Further, the specific RF data protocol, packet definition and related RF implementation details however selected do not alter the novelty of the disclosed contiguous sensor strips.

In one embodiment each update sent by a microcontroller 23 would be acknowledged by the central host as received. This is to prevent lost data count and alarm messages from affecting the accuracy and timeliness of the item monitoring system. Further the communication units of the item monitoring systems can be further enhanced by a dedicated data router and associated software that collects the data stream and formats the packets, buffers packets and performs other data processing functions that enhance the utility of the data to the central host and data base and application software.

The disclosed embodiments provide the core functionality for the microcontroller 23 to count and monitor items touching a hanger or surface space, although much of this functionality could, instead, be provided by the central host 50 if so desired. As one skilled in the art will realize there is significant enhanced functionality by incorporating additional capabilities including the ability: (i) to update the microcontroller 23 from a remote location, such as the central host, with an updated application control program and/or updated item data as may be retrieved during a cold or warm restart, (ii) of the microcontroller 23 to cause to be printed at a nearby coupon printer 56, as shown schematically in FIG. 5, an on-demand coupon in response to the selection of an item 14 followed fairly immediately by its replacement to the hanger or shelf surface, (iii) to present on an associated display 58, as also shown in FIG. 5, certain data of interest such as item identification, price, price per unit of measure and other such display data of interest to the local installation management (e.g., a flashing message or other indication could be provided by the display to assist store personnel in locating a particular shelf or hanger), (iv) of the microcontroller 23 or, more particularly, the communication unit 24 to receive item specific identification data via wireless or other means directly from a transmitter, such as an RFID tag, associated with each item 14 or container (e.g., pallet or box) of items 14, (v) of two-dimensional surface space to be divided during training by a narrow strip of material attached by an adhesive or other retention means including but not limited to living hinges on each strip that are affixed to the surface space helping maintain an orderly row and column arrangement, (vi) of the central host to support an item inventory map referenced to hanger and surface space so as to correlate and display inventory location to count update and alarm events, (vii) of the central host to associate alarm events to coverage surveillance cameras or other equipment 54 in support of quickly identifying potential shrink/theft and incorrect restocking events, and (viii) of the microcontroller 23 having as input a wireless RF/ID communications unit such that the microcontroller of a hanger and/or shelf could uniquely identify each item on its sensor surface for purposes of an individual stock item tracking and monitoring use. With respect to the inventory map mentioned above, the central host 50 may be preloaded with information relating to the items stored on the hangers or shelves such as item weight, size, footprint and an image of the front panel of the item. As such, the central host of one embodiment can generate an inventory map that identifies the items and defines the number of items located in various columns upon a shelf or hanger and, in one embodiment, creates an image of the items upon the shelf based upon the preload image of the item.

A further consideration involves the use of multiple layers of different formulations of analog-type electric conductive ink to achieve varied levels and ranges of pressure sensitivity on a strip 21. Additionally the arrangement of a strip 21 in a repeating side-by-side pattern with overlapping pressure sensitivities can detect a much wider range of pressures than a single strip sensor can by itself.

As one skilled in the art will recognize the formulations and combinations of the analog-type electric conductive ink, and/or other similarly variable contiguous strip sensors, can be varied while still achieving the advantages afforded by the present invention. Likewise, the strip sensor material can vary widely in dimensions, shape, layering, functional implementation (e.g., either series or parallel resistor networks), and touching sensor surface means to supporting surface and remain within the intent and scope of the disclosed invention.

While the item monitoring system of the present invention has been described in conjunction with hangers and shelves or other two-dimensional surfaces, the item monitoring system can be utilized to monitor item placement upon a number of surfaces or the like. For example a collection of storage bins, such as a divided drawer, may contain a plurality of items that would be beneficial to monitor. However, bins are frequently configurable by permitting horizontal and vertical dividers to be inserted at various positions to subdivide the drawer into storage bins as desired. While a plurality of sensor strips as described above in conjunction with the monitoring of a two-dimensional surface could be readily employed if the bin did not include dividers, the capability to configure the bin by the insertion of dividers suggests that the sensor strips 21 should be differently configured as well. In this regard, a substrate carrying a plurality of sensor strips arranged in a parallel side-by-side relationship can be fabricated as described above in conjunction with the shelf embodiment. However, each sensor strip should be sized to approximately equal the smallest sized storage bin into which the divided drawer may be subdivided. For example, if a bin supports the insertion of a maximum number of dividers so as to define storage bins that are approximately 0.75" by 0.75 inch, the sensor strips should be sized equivalently and should be positioned upon the substrate in positions that align with the various storage bins.

In this embodiment, the substrate also supports a plurality of signal and return traces extending from the processing element. Since the configuration of the divided drawer into storage bins may not be known in advance, the sensor strips are not electrically connected to the crossing signal and return traces in advance. Instead, following configuration of the storage bins via the insertion of the desired dividers, the various traces are then connected to appropriate ones of the sensor strips such that the sensor strips within each storage bin are each connected to their own signal and return traces. As such, the sensor strips within a respective storage bin can communicate with the processing element via a different pair of signal and return traces that the sensor strips in other storage bins. Thus, the processing element can individually monitor the items in each storage bin in a divided drawer.

In order to further conserve real estate, the substrate supporting the strip sensors, the signal and return traces, the processing element and the like may have a folded configuration. In this regard, the region of the substrate that primarily carries the conductive traces may be folded 180 degrees under the remainder of the substrate that carries the strip sensors. The region of the substrate that carries the processing element, the communications unit and the like can also be extended or folded upwardly from the remainder of the substrate so as to extend upwardly along a side wall of the bin. Thus, the vast majority, if not all, of the surface area within the bin can be covered by strip sensors as a result of the folded configuration. While this configuration is particularly useful for bin applications, the folded configuration can also be employed in any other application without departing from the spirit and scope of the present invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended documents. Although specific terms are employed herein, they are used in a generic and descriptive sense only and not for purposes of limitation.

I claim:

1. An item monitoring system comprising:
a sensor strip extending in a generally linear fashion, said sensor strip comprising a pluralilty of sensors functioning simultaneously in a resistor network selected from the group of a parallel resisitor network and a series resistor network, and sensor strip providing a single output that is dependent upon force applied thereto such that the output provided by said sensor strip is reflective of a cumulative effect of one or more items placed upon said sensor strip; and
a processing element in communication with said sensor strip for receiving and processing the output of said sensor strip,
wherein one or more items contacts a plurality of sensors and a single output is provided to the processing element.

2. An item monitoring system according to claim 1 wherein said sensor strip is configured such that each item that is placed upon the sensor strip causes a discrete change in a property of said sensor strip at a pluralilty of points of contact with the said single output provided by said sensor strip being reflective of the cumulative net change in the property of said sensor strip and corresponding to the number of items placed upon said sensor strip.

3. An item monitoring system according to claim 2 wherein said sensor strip comprises at least one layer of pressure sensitive material and upper and lower conductive traces on opposite sides of the pressure sensitive material.

4. An item monitoring system according to claim 3 wherein said upper and lower conductive traces are shaped in the form of repeating sinuous patterns.

5. An item monitoring system according to claim 4 further comprising a signal trace and a return trace, wherein one end of each sinuous pattern defined by one of said upper and lower conductive traces is electrically connected to said signal trace, and wherein one end of each sinuous pattern defined by the other one of said lower or upper conductive traces is electrically connected to said return trace forming said single output from said sensor strip.

6. An item monitoring system according to claim 5 further comprising a dielectric layer disposed upon one of said signal and return traces, wherein the other of said signal and return traces is disposed upon said dielectric layer such that said signal and return traces have an overlaid configuration in an area not including the sinuous pattern.

7. An item monitoring system according to claim 4 wherein the upper and lower conductive traces define a plurality of sinuous patterns arranged physically along the length of said sensor strip and connected electrically to form a parallel resistor network forming said single output from said sensor strip.

8. An item monitoring system according to claim 3 wherein said pressure sensitive material comprises a pressure sensitive ink.

9. An item monitoring system according to claim 2 wherein said sensor strip comprises a pair of conductive traces in a pattern layout and a pressure sensitive, variable resistance material overlaying said pair of conductive traces for electrically interconnecting said pair of conductive traces upon application of pressure thereto by means of the pressure sensitive, variable resistance material forming said single output from said sensor strip.

10. An item monitoring system according to claim 1 further comprising a plurality of sensor strips arranged in parallel such that each item placed thereupon applies pressure to at least one of said sensor strips and alters a property of said sensor strip at its respective point of contact such that the cumulative net change in the output of each said single output from said sensor strips is related to a number of items disposed thereupon.

11. An item monitoring system according to claim 1 further comprising a flexible substrate for supporting said sensor strip and said processing element.

12. An item monitoring system according to claim 1 further comprising a plurality of sensor strips extending in parallel and being configured to have different sensitivity to the applied force such that the plurality of sensor strips collectively have a greater range of sensitivity than any one sensor strip has individually.

13. An item monitoring system according to claim 1 further comprises a protective coating that overlays said sensor strip and that includes predefined markings.

14. An item monitoring system according to claim 13 further comprising data and power bus lines connected to said communication unit and a power source, respectively, and a plurality of sensor strips connected to the data and power bus lines so as to share a common communication unit and power source.

* * * * *